(12) United States Patent
Sengupta et al.

(10) Patent No.: US 11,172,477 B2
(45) Date of Patent: Nov. 9, 2021

(54) MULTI-TRANSPORT BLOCK SCHEDULING

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 16/665,337

(22) Filed: Oct. 28, 2019

(65) Prior Publication Data
US 2020/0145964 A1    May 7, 2020

Related U.S. Application Data

(60) Provisional application No. 62/755,309, filed on Nov. 2, 2018.

(51) Int. Cl.
*H04W 72/14* (2009.01)
*H04W 74/00* (2009.01)
(Continued)

(52) U.S. Cl.
CPC ......... *H04W 72/042* (2013.01); *H04L 1/1861* (2013.01); *H04L 5/0053* (2013.01)

(58) Field of Classification Search
CPC ..... H04L 1/1887; H04L 1/0025; H04L 1/009; H04L 1/1841; H04L 1/0083;
(Continued)

(56) References Cited

U.S. PATENT DOCUMENTS 3,877,026 A * 4/1975 Wintz ............... H03M 1/84
                                           341/138
4,020,463 A * 4/1977 Himmel ............ G06K 9/00154
                                           382/242
(Continued)

FOREIGN PATENT DOCUMENTS

KR     20200018353 A  *  2/2020
WO  WO2012153582 A1 * 11/2012
(Continued)

OTHER PUBLICATIONS

The Evolution of LTE Physical Layer Control Channels by Mao Wang; Jingjing Zhang; Bingying Ren; Wenjie Yang; Jun Zou; Min Hua; Xiaohu You Published in: IEEE Communications Surveys & Tutorials (vol. 18, Issue: 2, Secondquarter2016) (Year: 2016).*
(Continued)

*Primary Examiner* — William D Cumming
(74) *Attorney, Agent, or Firm* — Holland & Hart LLP

(57) ABSTRACT

In methods, systems, and devices for wireless communications are described, a user equipment (UE) may receive a downlink control information (DCI) block including DCI for a set of transport blocks scheduled for the UE, the DCI including a set of fields. The UE may decode the DCI block to obtain the DCI for the set of transport blocks, where at least two fields of the downlink control information are jointly decoded according to an encoding scheme, and where each possible output of the encoding scheme corresponds to a jointly valid combination of the at least two fields. The UE may receive the set of transport blocks from a base station based on the DCI.

30 Claims, 14 Drawing Sheets

(51) Int. Cl.
*H04W 72/04* (2009.01)
*H04L 5/00* (2006.01)
*H04L 1/18* (2006.01)

(58) Field of Classification Search
CPC  H04L 1/0031; H04W 74/0833; H04W 72/14; H04W 72/048; H04W 72/1257
USPC .............. 455/69, 115.3; 370/335, 328, 469
See application file for complete search history.

(56) References Cited

U.S. PATENT DOCUMENTS

| | | | | | |
|---|---|---|---|---|---|
| 4,445,225 | A | * | 4/1984 | White | G06K 19/10 235/491 |
| 4,476,382 | A | * | 10/1984 | White | G06K 19/10 235/487 |
| 8,351,400 | B2 | * | 1/2013 | Damnjanovic | H04L 1/1841 370/335 |
| 8,412,114 | B2 | * | 4/2013 | Visoz | H04L 1/0025 455/69 |
| 8,416,808 | B2 | * | 4/2013 | Sjogren | H04L 1/0084 370/469 |
| 9,761,231 | B2 | * | 9/2017 | Kjoerling | G10L 19/008 |
| 10,645,730 | B2 | * | 5/2020 | Cao | H04W 72/042 |
| 2005/0276249 | A1 | * | 12/2005 | Damnjanovic | H04L 1/1887 370/335 |
| 2010/0003934 | A1 | * | 1/2010 | Visoz | H04L 1/0025 455/115.3 |
| 2010/0150062 | A1 | * | 6/2010 | Sjogren | H04L 1/0084 370/328 |
| 2016/0217797 | A1 | * | 7/2016 | Kjoerling | G10L 19/008 |
| 2018/0295651 | A1 | * | 10/2018 | Cao | H04W 74/0833 |
| 2019/0372719 | A1 | * | 12/2019 | Talarico | H04W 72/042 |
| 2020/0145964 | A1 | * | 5/2020 | Sengupta | H04L 1/0029 |
| 2020/0245376 | A1 | * | 7/2020 | Cao | H04W 72/14 |
| 2020/0260391 | A1 | * | 8/2020 | Zhou | H04L 1/1819 |
| 2021/0144743 | A1 | * | 5/2021 | Rastegardoost | H04W 72/1257 |
| 2021/0184812 | A1 | * | 6/2021 | MolavianJazi | H04W 72/048 |

FOREIGN PATENT DOCUMENTS

| | | |
|---|---|---|
| WO | WO-2017167308 A1 | 10/2017 |
| WO | WO-2018175896 A1 | 9/2018 |

OTHER PUBLICATIONS

Cellular LTE-A Technologies for the Future Internet-of-Things: Physical Layer Features and Challenges by Mahmoud Elsaadany • Abdelmohsen Ali • Walaa Hamouda Published in: IEEE Communications Surveys & Tutorials (vol. 19, Issue: 4, pp. 2544-2572) Oct. 2017 (Year: 2017).*
Intel Corporation: "NR URLLC: DCI Formats", 3GPP Draft, 3GPP TSG RAN WG1 Meeting #93, R1-1806518 Intel—NR URLLC: DCI Formats, 3rd Generation Partnership Project (3GPP), Mobile Competence Centre, 650, Route Des Lucioles, F-06921 Sophia-Antipolis Cedex, France, vol. RAN WG1, No. Susan, Korea, May 21, 2018-May 25, 2018, May 28, 2018 (May 20, 2018), XP051441719, 9 Pages, Retrieved from the Internet: URL: http://www.3gpp.org/ftp/Meetings%5F3GPP%5FSYNC/RAN1/Docs/, [retrieved on May 20, 2018], p. 2-last paragraph.
International Search Report and Written Opinion—PCT/US2019/058510—ISAEPO—dated May 20, 2020.
Panasonic: "DCI Design for MTC", 3GPP Draft, 3GPP TSG RAN WG1 Meeting #82bis, R1-155336, 3rd Generation Partnership Project (3GPP), Mobile Competence Centre, 650, Route Des Lucioles, F-06921, Sophia-Antipolis Cedex, France, vol. RAN WG1, No. Malmo, Sweden, Oct. 5, 2015-Oct. 9, 2015, Oct. 4, 2015 (Oct. 4, 2015), XP051039634, pp. 1-5, Retrieved from the Internet: URL: http://www.3gpp.org/ftp/Meetings_3GPP_SYNC/RAN1/Docs/, [retrieved on Oct. 4, 2015], Table 3, 5th Row.
Panasonic: "WF on Encoding Method of MCS/TBS Values for NB-PDSCH", 3GPP Draft, 3GPP TSG RAN WG1 Meeting #84, R1-161237 MCS TBS, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 24, 2016 (Feb. 24, 2016), XP051079171, 3 Pages, Retrieved from the Internet: URL: http://www.3gpp.org/ftp/tsg_ran/WG1_RL1/TSGR1_84/Docs/, [retrieved on Feb. 24, 2016], Option 4.
Sierra Wireless: "Multiple TB Grant Design for Unicast", 3GPP Draft, 3GPP TSG RAN WG1 Meeting 94, R1-1808355 LTE-M MULTITBS, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 10, 2018 (Aug. 10, 2018), XP051515737, 11 pages, Retrieved from the Internet: URL: http://www.3gpp.org/ftp/tsg%5Fran/WG1%5FRL1/TSGR1%5F94/Docs/R1%2D1808355%2Ezip, [retrieved on Aug. 10, 2018], Appendix II.
AT&T: "Overview of Physical Layer Enhancements for NR URLLC", 3GPP Draft, 3GPP TSG RAN WG1 Meeting #94, R1-1809055 Overview of Physical Layer Enhancements for NR URLLC, 3rd Generation Partnership Project (3GPP), Mobile Competence Centre, 650, Route Des Lucioles, F-06921 Sophia-Antipolis CE, vol. RAN WG1, No. Gothenburg, Sweden, Aug. 20, 2018-Aug. 24, 2018, Aug. 11, 2018 (Aug. 11, 2018), XP051516425, 27 Pages, Retrieved from the Internet: URL: http://www.3gpp.org/ftp/tsg%5Fran/WG1%5FRL1/TSGR1%5F94/Docs/R1%2D1809055%2Ezip [retrieved on Aug. 11, 2018], p. 10.
Huawei, et al., "DCI Contents and Formats in NR", 3GPP Draft, 3GPP TSG RAN WG 1 Meeting #91, R1-1719389, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369298, 11 Pages, Retrieved from the Internet URL: http://www.3gpp.org/ftp/tsg%5Fran/WG1%5FRL1/TSGR1%5F91/Docs/ , [retrieved on Nov. 18, 2017] p. 2-p. 5.
Nokia, et al., "On Compact DCI for NR URLLC", 3GPP Draft, 3GPP TSG RAN WG1 Meeting #94-bis ,R1-1818664_Compact DCI_Final, 3rd Generation Partnership Project (3GPP), Mobile Competence Centre, 650, Route Des Lucioles, F-06921 Sophia-Antipolis Cedex, France, vol. RAN WG1, No. Chengdu, P.R. China, Oct. 8, 2018-Oct. 12, 2018, Sep. 28, 2018 (Sep. 28, 2018), XP051518070, 6 Pages, Retrieved from the Internet: URL: http://www.3gpp.org/ftp/tsg%5Fran/WG1%5FRL1/TSGR1%5F94b/Docs/R1%2D1810664%2Ezip [retrieved on Sep. 28, 2018], p. 2.
Partial International Search Report—PCT/US2019/058510—ISA/EPO—dated Feb. 10, 2020.
Samsung: "Scheduling of Multiple Transport Blocks for MTC", 3GPP Draft, 3GPP TSG RAN WG1 Meeting #94bis, R1-1810822, 3rd Generation Partnership Project (3GPP), Mobile Competence Centre, 658, Route Des Lucioles, F-86921 Sophia-Antipolis Cedex, France, vol. RAN WG1, No. Chengdu, China, Oct. 8, 2018-Oct. 12, 2018, Sep. 29, 2018 (Sep. 29, 2018), XP051518227, 7 pages, Retrieved from the Internet: URL: http://www.3gpp.org/ftp/tsg%5Fran/WG1%5FRL1/TSGR1%5F94b/Docs/R1%2D1810822%2Ezip [retrieved on 2818-89-29], Section 3.
Texas Instruments: "PDCCH Content and Formats", 3GPP Draft, 3GPP TSG RAN WG1 52bis, R1-081367 TI PDCCH Format, 3rd Generation Partnership Project (3GPP), Mobile Competence Centre, 650, Route Des Lucioles, F-06921 Sophia-Antipolis Cedex, France, vol. RAN WG1, No. Shenzhen, China, Mar. 31, 2008-Apr. 4, 2008, Mar. 27, 2008 (Mar. 27, 2008), XP050596691, pp. 1-6, [retrieved on Mar. 27, 2008], pp. 3, 4.

* cited by examiner

MULTI-TRANSPORT BLOCK SCHEDULING

CROSS REFERENCE

The present application for patent claims the benefit of U.S. Provisional Patent Application No. 62/755,309 by SENGUPTA et al., entitled "MULTI-TRANSPORT BLOCK SCHEDULING," filed Nov. 2, 2018, assigned to the assignee hereof, and expressly incorporated herein.

BACKGROUND

The following relates generally to wireless communications, and more specifically to multi-transport block scheduling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may transmit downlink control information (DCI) to a user equipment (UE) to schedule an uplink or downlink transmission. The DCI may grant resources for transmission of a transport block, and the transmitting device transmits the transport block during the granted resources. Techniques for scheduling transport blocks with DCI can be improved.

SUMMARY

The described techniques relate to improved methods, systems, devices, and apparatuses that support multi-transport block scheduling. Generally, the described techniques provide for scheduling multiple transport blocks for a user equipment (UE) with a single downlink control information (DCI) block. A base station described herein may transmit a single DCI block to schedule multiple transport blocks. One possible technique for scheduling multiple transport blocks with one DCI block is to group multiple DCIs in a single transmission. This may provide fine granularity for scheduling information for each of the transport blocks. However, the UE may still monitor and remain powered on for as long as it would if it were still receiving multiple, separate DCI.

Therefore, a UE and base station described herein may implement techniques for reducing the size of a DCI block which schedules multiple transport blocks. For example, the base station may use joint encoding to encode multiple fields of the DCI block such that invalid or redundant configurations of those fields are not valid outputs of the encoding process. By reducing the number of valid outputs of the encoding process, the overall size of the DCI block can be reduced, thereby increasing the efficiency of scheduling multiple transport blocks. The UE may receive the information scheduling the multiple transport blocks in comparatively fewer bits than multiple, separate DCI, meaning that the UE may go to a lower power mode or sleep state sooner after decoding the useful information from the DCI block.

A method of wireless communications at a UE is described. The method may include receiving a downlink control information block including downlink control information for a set of transport blocks scheduled for the UE, where the downlink control information includes a set of fields, decoding the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields, and receiving the set of transport blocks from a base station based on the downlink control information.

An apparatus for wireless communications at a UE is described. The apparatus may include a processor, memory coupled with the processor, and instructions stored in the memory. The instructions may be executable by the processor to cause the apparatus to receive a downlink control information block including downlink control information for a set of transport blocks scheduled for the UE, where the downlink control information includes a set of fields, decode the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields, and receive the set of transport blocks from a base station based on the downlink control information.

Another apparatus for wireless communications at a UE is described. The apparatus may include means for receiving a downlink control information block including downlink control information for a set of transport blocks scheduled for the UE, where the downlink control information includes a set of fields, decoding the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields, and receiving the set of transport blocks from a base station based on the downlink control information.

A non-transitory computer-readable medium storing code for wireless communications at a UE is described. The code may include instructions executable by a processor to receive a downlink control information block including downlink control information for a set of transport blocks scheduled for the UE, where the downlink control information includes a set of fields, decode the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields, and receive the set of transport blocks from a base station based on the downlink control information.

In some examples of the method, apparatuses, and non-transitory computer-readable medium described herein, the at least two fields include a HARQ process identifier field and a new data indicator field, and decoding the downlink control information may include operations, features, means, or instructions for omitting new data indicator information from the new data indicator field for unscheduled HARQ processes from the downlink control information block.

In some examples of the method, apparatuses, and non-transitory computer-readable medium described herein, the at least two fields further include a redundancy version index field, and decoding the downlink control information further may include operations, features, means, or instructions for omitting redundancy version index information for unscheduled HARQ processes from the downlink control information block.

In some examples of the method, apparatuses, and non-transitory computer-readable medium described herein, the HARQ process identifier field includes a number of bits equal to a number of transport blocks scheduled by the downlink control information.

In some examples of the method, apparatuses, and non-transitory computer-readable medium described herein, the new data indicator field includes a number of bits equal to a number of transport blocks scheduled by the downlink control information.

In some examples of the method, apparatuses, and non-transitory computer-readable medium described herein, the set of fields includes a number of repetitions field configured to signal a number of repetitions per transport block of the set of transport blocks.

In some examples of the method, apparatuses, and non-transitory computer-readable medium described herein, the at least two fields include the number of repetitions field and a redundancy version indicator field, and decoding the downlink control information may include operations, features, means, or instructions for setting a size of the redundancy version indicator field based on the number of repetitions per transport block signaled by the number of repetitions field.

In some examples of the method, apparatuses, and non-transitory computer-readable medium described herein, setting the size of the redundancy version indicator field may include operations, features, means, or instructions for setting the size of the redundancy version indicator field to 0 bits if the number of repetitions per transport block may be greater than or equal to 4, or setting the size of the redundancy version indicator field to 1 bit if the number of repetitions per transport block may be equal to 2, or setting the size of the redundancy version indicator field to 2 bits if the number of repetitions per transport block may be equal to 1.

In some examples of the method, apparatuses, and non-transitory computer-readable medium described herein, the at least two fields include the number of repetitions field and a modulation and coding scheme indicator field, and decoding the downlink control information may include operations, features, means, or instructions for setting a size of the modulation and coding scheme indicator field based on one or more of: a number of repetitions per transport block signaled by the number of repetitions field or a channel condition.

Some examples of the method, apparatuses, and non-transitory computer-readable medium described herein may further include operations, features, means, or instructions for receiving from the base station a message indicating a restriction of values for the modulation and coding scheme indicator field based on the channel condition.

In some examples of the method, apparatuses, and non-transitory computer-readable medium described herein, a modulation and coding scheme that may be common to each transport block of the set of transport blocks or a bitmap separately indicating a modulation and coding scheme for each transport block of the set of transport blocks.

Some examples of the method, apparatuses, and non-transitory computer-readable medium described herein may further include operations, features, means, or instructions for receiving from the base station an indication of whether the modulation and coding scheme indicator may be to signal the modulation and coding scheme that may be common to each transport block of the set of transport blocks or the bitmap separately indicating the modulation and coding scheme for each transport block of the set of transport blocks.

In some examples of the method, apparatuses, and non-transitory computer-readable medium described herein, the at least two fields include the number of repetitions field and a frequency hopping indicator field, and decoding the downlink control information may include operations, features, means, or instructions for omitting the frequency hopping indicator field if a number of repetitions per transport block signaled by the number of repetitions field may be equal to 1.

In some examples of the method, apparatuses, and non-transitory computer-readable medium described herein, the number of repetitions field includes one or more of a number of repetitions that may be common to each transport block of the set of transport blocks or a bitmap separately indicating a number of repetitions for each transport block of the set of transport blocks.

Some examples of the method, apparatuses, and non-transitory computer-readable medium described herein may further include operations, features, means, or instructions for receiving from the base station an indication of whether the number of repetitions field signals the number of repetitions that may be common to each transport block of the set of transport blocks or the bitmap separately indicating the modulation and coding scheme for each transport block of the set of transport blocks.

A method of wireless communications at a base station is described. The method may include generating downlink control information to schedule a set of transport blocks for a UE, the downlink control information including a set of fields, encoding the downlink control information into a downlink control information block for the set of transport blocks, where at least two fields of the downlink control information are jointly encoded according to an encoding scheme, where each possible output of the encoding scheme corresponds to a jointly valid combination of the at least two fields, transmitting the downlink control information block for the set of transport blocks to the UE, and transmitting the set of transport blocks to the UE based on the downlink control information.

An apparatus for wireless communications at a base station is described. The apparatus may include a processor, memory coupled with the processor, and instructions stored in the memory. The instructions may be executable by the processor to cause the apparatus to generate downlink control information to schedule a set of transport blocks for a UE, the downlink control information including a set of fields, encode the downlink control information into a downlink control information block for the set of transport blocks, where at least two fields of the downlink control information are jointly encoded according to an encoding scheme, where each possible output of the encoding scheme corresponds to a jointly valid combination of the at least two fields, transmit the downlink control information block for the set of transport blocks to the UE, and transmit the set of transport blocks to the UE based on the downlink control information.

Another apparatus for wireless communications at a base station is described. The apparatus may include means for generating downlink control information to schedule a set of transport blocks for a UE, the downlink control information including a set of fields, encoding the downlink control information into a downlink control information block for the set of transport blocks, where at least two fields of the downlink control information are jointly encoded according to an encoding scheme, where each possible output of the encoding scheme corresponds to a jointly valid combination of the at least two fields, transmitting the downlink control information block for the set of transport blocks to the UE, and transmitting the set of transport blocks to the UE based on the downlink control information.

A non-transitory computer-readable medium storing code for wireless communications at a base station is described. The code may include instructions executable by a processor to generate downlink control information to schedule a set of transport blocks for a UE, the downlink control information including a set of fields, encode the downlink control information into a downlink control information block for the set of transport blocks, where at least two fields of the downlink control information are jointly encoded according to an encoding scheme, where each possible output of the encoding scheme corresponds to a jointly valid combination of the at least two fields, transmit the downlink control information block for the set of transport blocks to the UE, and transmit the set of transport blocks to the UE based on the downlink control information.

In some examples of the method, apparatuses, and non-transitory computer-readable medium described herein, the at least two fields include a HARQ process identifier field and a new data indicator field, and encoding the downlink control information may include operations, features, means, or instructions for omitting new data indicator information from the new data indicator field for unscheduled HARQ processes from the downlink control information block.

In some examples of the method, apparatuses, and non-transitory computer-readable medium described herein, the at least two fields further include a redundancy version index field, and encoding the downlink control information further may include operations, features, means, or instructions for omitting redundancy version index information for unscheduled HARQ processes from the downlink control information block.

In some examples of the method, apparatuses, and non-transitory computer-readable medium described herein, the HARQ process identifier field includes a number of bits equal to a number of transport blocks scheduled by the downlink control information.

In some examples of the method, apparatuses, and non-transitory computer-readable medium described herein, the new data indicator field includes a number of bits equal to a number of transport blocks scheduled by the downlink control information.

In some examples of the method, apparatuses, and non-transitory computer-readable medium described herein, the set of fields includes a number of repetitions field configured to signal a number of repetitions per transport block of the set of transport blocks.

In some examples of the method, apparatuses, and non-transitory computer-readable medium described herein, the at least two fields include the number of repetitions field and a redundancy version indicator field, and encoding the downlink control information may include operations, features, means, or instructions for setting a size of the redundancy version indicator field based on the number of repetitions per transport block signaled by the number of repetitions field.

In some examples of the method, apparatuses, and non-transitory computer-readable medium described herein, setting the size of the redundancy version indicator field may include operations, features, means, or instructions for setting the size of the redundancy version indicator field to 0 bits if the number of repetitions per transport block may be greater than or equal to 4, or setting the size of the redundancy version indicator field to 1 bit if the number of repetitions per transport block may be equal to 2, or setting the size of the redundancy version indicator field to 2 bits if the number of repetitions per transport block may be equal to 1.

In some examples of the method, apparatuses, and non-transitory computer-readable medium described herein, the at least two fields include the number of repetitions field and a modulation and coding scheme indicator field, and encoding the downlink control information may include operations, features, means, or instructions for setting a size of the modulation and coding scheme indicator field based on one or more of: a number of repetitions per transport block signaled by the number of repetitions field or a channel condition.

Some examples of the method, apparatuses, and non-transitory computer-readable medium described herein may further include operations, features, means, or instructions for transmitting to the UE a message indicating a restriction of values for the modulation and coding scheme indicator field based on the channel condition.

In some examples of the method, apparatuses, and non-transitory computer-readable medium described herein, the modulation and coding scheme indicator field signals one or more of: a modulation and coding scheme that may be common to each transport block of the set of transport blocks or a bitmap separately indicating a modulation and coding scheme for each transport block of the set of transport blocks.

Some examples of the method, apparatuses, and non-transitory computer-readable medium described herein may further include operations, features, means, or instructions for transmitting to the UE an indication of whether the modulation and coding scheme indicator is to signal the modulation and coding scheme that may be common to each transport block of the set of transport blocks or the bitmap separately indicating the modulation and coding scheme for each transport block of the set of transport blocks.

In some examples of the method, apparatuses, and non-transitory computer-readable medium described herein, the at least two fields include the number of repetitions field and a frequency hopping indicator field, and encoding the downlink control information may include operations, features, means, or instructions for omitting the frequency hopping indicator field if a number of repetitions per transport block signaled by the number of repetitions field may be equal to 1.

In some examples of the method, apparatuses, and non-transitory computer-readable medium described herein, the number of repetitions field includes one or more of: a number of repetitions that may be common to each transport block of the set of transport blocks or a bitmap separately indicating a number of repetitions for each transport block of the set of transport blocks.

Some examples of the method, apparatuses, and non-transitory computer-readable medium described herein may further include operations, features, means, or instructions for transmitting to the UE an indication of whether the number of repetitions field is to signal the number of repetitions that may be common to each transport block of the set of transport blocks or the bitmap separately indicating the modulation and coding scheme for each transport block of the set of transport blocks.

DETAILED DESCRIPTION

A base station may transmit downlink control information (DCI) to a user equipment (UE) to schedule a transmission. In some wireless communications systems, a single DCI transmission may schedule a single transport block. If the UE has multiple pending transport blocks to transmit or receive, the base station may transmit a DCI for each of the pending transport blocks. This may result in high power consumption for the UE, as the UE may then monitor for each of the DCI individually and decode them in order to receive the scheduling for the transport blocks.

To improve the efficiency and reduce the power consumption associated with downlink scheduling, a base station described herein may instead use a single DCI block to schedule multiple transport blocks. The DCI block may include DCI for scheduling each of the multiple transport blocks. One possible technique for scheduling multiple transport blocks with one DCI block is to group multiple conventional DCIs in a single transmission. This may provide fine granularity for scheduling information for each of the transport blocks. However, the UE may still monitor and remain on for as long as it would if it were still receiving multiple, separate conventional DCI.

Therefore, a UE and base station described herein may implement techniques for reducing the size of a DCI block which schedules multiple transport blocks. For example, the base station may encode the DCI block to reduce a number of invalid or redundant configurations. If, for example, a first field of the DCI block eliminates some options for a second field of the DCI block, those configurations may not be valid inputs of the encoding process for the DCI block. The base station may jointly encode one or more fields of the DCI block using an encoding scheme for which only valid field combinations are valid inputs to the encoding process. Put differently, each possible output of the encoding process corresponds to a valid, non-redundant combination of fields in the DCI block. The UE may receive downlink control information for each of the transport blocks in comparatively fewer bits than multiple, separate conventional DCI, and the UE may go to a lower power mode or sleep state after decoding the useful information from the DCI block.

Aspects of the disclosure are initially described in the context of a wireless communications system. Aspects of the disclosure are further illustrated by and described with reference to apparatus diagrams, system diagrams, and flowcharts that relate to multi-transport block scheduling.

Figure 1:
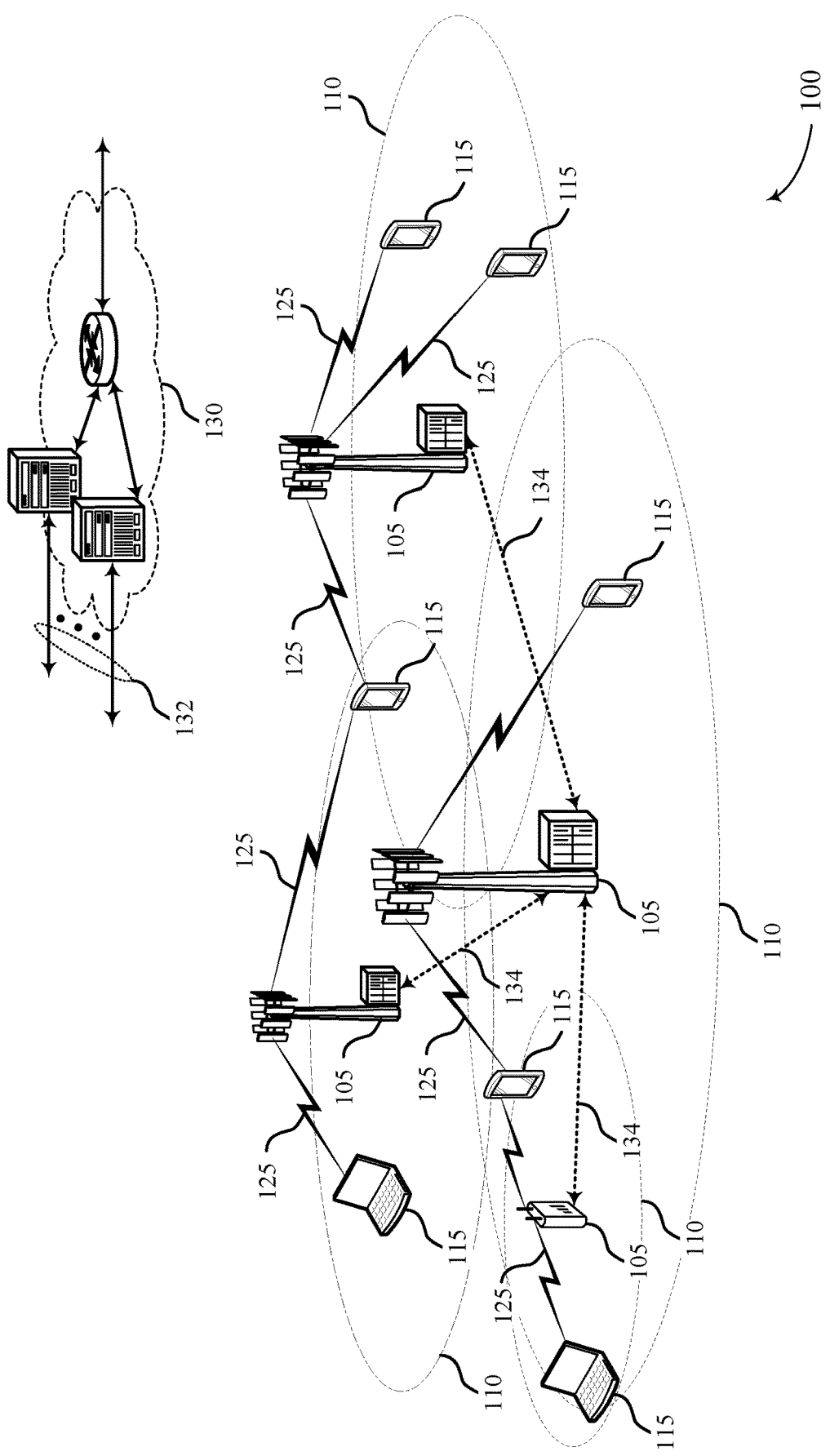
FIG. 1 illustrates an example of a system for wireless communications that supports multi-transport block scheduling in accordance with aspects of the present disclosure.

FIG. 1 illustrates an example of a wireless communications system 100 that supports multi-transport block scheduling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$ 1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of defined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 described herein may implement techniques for scheduling multiple transport blocks with a single DCI block. The base station 105 may transmit the DCI block which includes DCI (e.g., scheduling information) for each of the multiple transport blocks. The UE 115 and base station 105 may further implement techniques to reduce the size of a DCI block which schedules the multiple transport blocks. For example, the base station 105 may encode the DCI block based on an encoding scheme which reduces or eliminates invalid or redundant field combinations. The base station 105 may jointly encode one or more fields of the DCI block to remove the redundant or invalid options.

Figure 2:
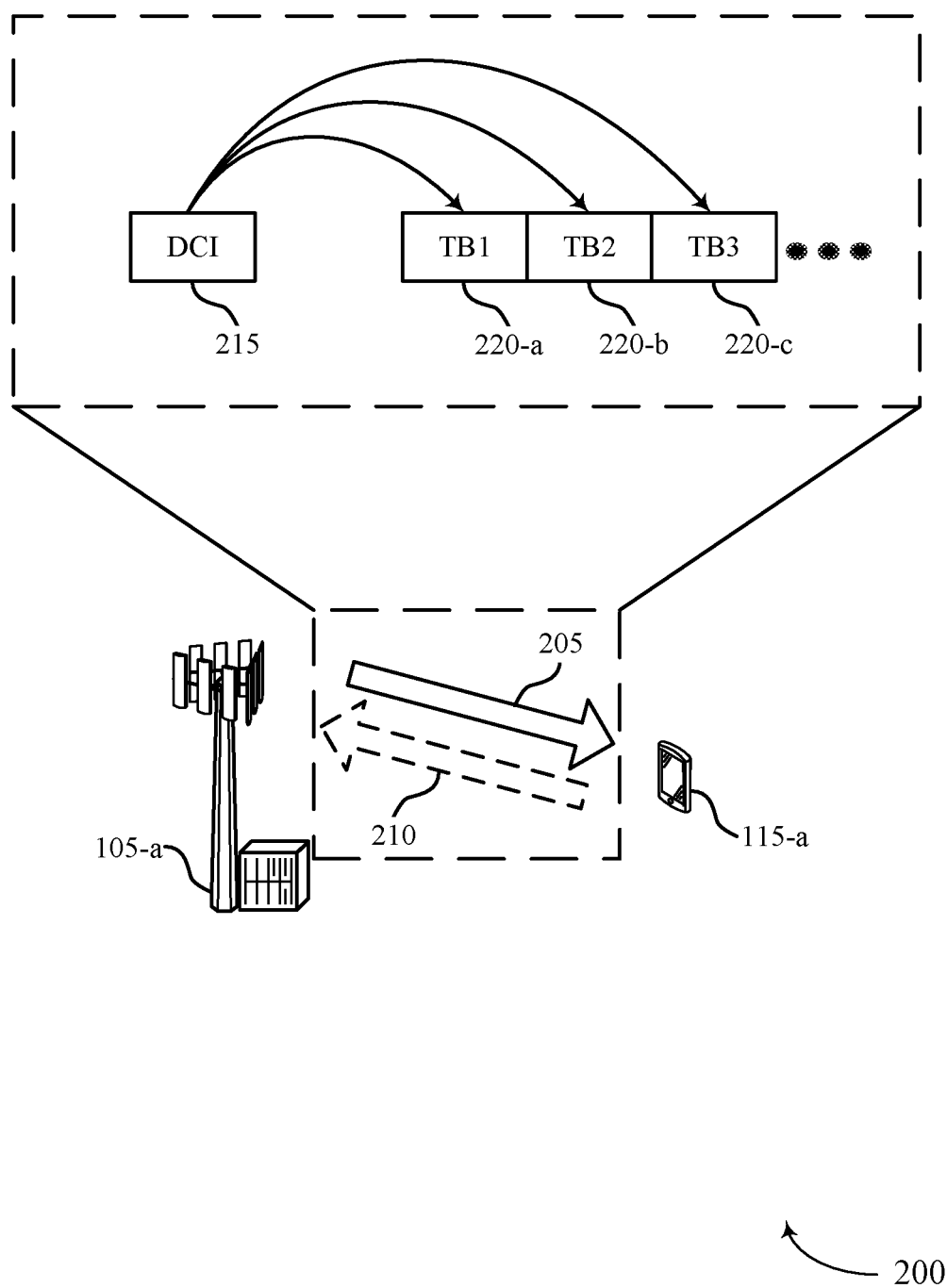
FIG. 2 illustrates an example of a wireless communications system that supports multi-transport block scheduling in accordance with aspects of the present disclosure.

FIG. 2 illustrates an example of a wireless communications system 200 that supports multi-transport block scheduling in accordance with aspects of the present disclosure. In some examples, wireless communications system 200 may implement aspects of wireless communications system 100. Wireless communications system 200 may include UE 115-a and base station 105-a, which may be respective examples of a UE 115 and a base station 105.

Base station 105-a and UE 115-a may communicate using a downlink link 205 and an uplink link 210. Base station 105-a may transmit DCI to UE 115-a on the downlink link 205 to schedule transmissions. For example, the DCI may schedule resources for base station 105-a to transmit a transport block 220 on the downlink link 205 to UE 115-a for downlink communications. Or, the DCI may schedule UE 115-a to transmit a transport block 220 on the uplink link 210 to base station 105-a for uplink communications. In some cases, the transport block 220 may carry uplink or downlink data and be transmitted on an uplink data channel (e.g., a physical uplink shared channel (PUSCH)) or a downlink data channel (e.g., a physical downlink shared channel (PDSCH)) scheduled by the DCI.

In some wireless communications systems, a single DCI transmission may schedule a single transport block. Thus, if the UE 115 has multiple pending transport blocks to transmit or receive, the base station 105 may transmit a DCI for each of the pending transport blocks. This may result in high power consumption for the UE 115, as the UE 115 may monitor for each of the DCI individually and decode them in order to receive the scheduling for the transport blocks.

Instead, base station 105-a may transmit a DCI block 215 to schedule multiple transport blocks 220. The DCI block 215 may include control information for each of the multiple transport blocks 220. For example, the DCI block 215 may schedule each of transport block 1 (TB1) 220-a, TB2 220-b, and TB3 220-c as well as other transport blocks 220 not shown. In some cases, the DCI block 215 may schedule fewer transport blocks 220 than what is shown. The DCI block 215 may schedule between 1 and N transport blocks 220, where N may be 2, 4, 8, and so on (e.g., where N is a power of 2, or $2^n$). The value of N may be configurable and may be based on, for example, a type of communications between base station 105-a and UE 115-a. For example, N may be based on whether the communications are machine type communications (MTC) or a coverage enhancement mode for MTC, whether the communications are IoT (e.g., narrowband (NB) IOT), etc. Techniques described herein may be applied for scheduling multiple uplink transport blocks or for scheduling multiple downlink transport blocks.

One possible technique for scheduling multiple transport blocks 220 with one DCI block 215 is to group multiple conventional DCIs in a single transmission. In one example, a conventional DCI may include 16 bits to schedule a single transport block 220, and base station 105-a may schedule eight transport blocks 220. According to this first technique, the grouped DCI transmission may be 128 bits long, where the first bit through the 16th bit schedule TB1 220-a, the 17th bit through the 32nd bit schedule TB2 220-b, the 33rd bit through the 48th bit schedule TB3 220-c, and so on. Other arrangements for the bits in the grouped DCI transmission may be possible, but generally the length of the grouped DCI transmission for scheduling N transport blocks 220 with a conventional DCI element which is B bits long is equal to N*B bits according to this technique. The grouped DCI transmission may support fine granularity for scheduling information per transport block 220. However, UE 115-a may still monitor and remain on for as long as it would if it were still receiving multiple, separate conventional DCI.

The wireless communications system 200 may support techniques for reducing the size of the DCI block 215. For example, some bits of the multiple conventional DCIs may be common across multiple transport blocks 220. Thus, the DCI block 215 may be compressed from the N*B bit example. UE 115-a may receive the information scheduling the transport blocks 220 in fewer bits and then be able to go to a lower power mode or sleep state after receiving all of the useful bits of the DCI block 215.

For example, the DCI block 215 may include a hybrid automated repeat request (HARQ) process identifier (ID). A conventional DCI may include three bits to signal which of the eight HARQ process IDs are used for the corresponding transport block 220. The DCI block 215 may use a bitmap of N bits, where N may be equal to the maximum number of possible HARQ processes. This may also be equal to the maximum number of transport blocks scheduled by the DCI block 215. If a bit in the bitmap is set to 0, this may indicate that there is no scheduled transport block corresponding to that HARQ process. In, for example, an 8-bit bitmap is '00000001', this may indicate that only 1 transport block, in the last of the 8 possible HARQ processes, is scheduled.

In some cases, there may be a restriction applied to the combination of HARQ processes. Therefore, there may be a restricted number of valid combinations for the HARQ processes. An 8-bit bitmap for eight transport blocks may indicate 256 total possible combinations of the eight transport blocks. However, not all 256 of these combinations may be supported. In an example, only transport blocks with contiguous HARQ identifiers may be scheduled. For example, if only two HARQ processes are scheduled, then HARQ process 0 and HARQ process 1 may be a valid example, but HARQ process 0 and HARQ process 2 may not be supported (e.g., as these HARQ processes are not adjacent and would normally be represented by '00000101' by an 8-bit bitmap). Therefore, the bitmap may include a number of bits which corresponds to a limited subset of combinations of the transport blocks. In this example, the bitmap, corresponding to the eight transport blocks, may contain less than 8-bits. For example, if only 120 of the 256 total possible combinations are supported or valid, then the HARQ bitmap for eight transport blocks may be use seven bits. In some cases, UE 115-a may determine whether the HARQ processes are in an ascending or descending order or organized in another manner. The order of the HARQ processes may be configured (e.g., by RRC signaling) or indicated by the DCI block 215.

In some cases, the DCI block 215 may include a new data indicator. In a conventional DCI, the new data indicator may be one bit which is toggled (e.g., 0 to 1 or 1 to 0) when new data is transmitted in the HARQ processes. The DCI block 215 may include a bitmap of N bits, where N is equal to the number of transport blocks 220. In some cases, N may be equal to the number of HARQ processes. Each bit may toggle corresponding to whether there is new data in the HARQ process.

The DCI block 215 may also include a redundancy version (RV) indicator. In a conventional DCI, the RV indicator may include two bits to signal RV 0, 1, 2, or 3 for the transport block/HARQ process ID. The DCI block 215 may include a bitmap of 2N bits to signal the RV for each HARQ process, where N is equal to the number of transport blocks 220 or the number of HARQ processes.

In some examples, the DCI block 215 may include an indicator for a number of repetitions per transport block 220. In a conventional DCI, there may be a variable number of bits (e.g., 2 or 3 bits) depending on a coverage enhancement mode (e.g., A or B) or NB-IoT characteristics. In some cases, the DCI block 215 may indicate the same number of repetitions for each transport block 220 scheduled by the DCI block 215. For example, TB1 220-a may be repeated the same number of times as TB2 220-b, and each transport block 220 may be repeated the same number of times as each other transport block 220 scheduled by the DCI block 215. Thus, the DCI block 215 may include an r bit field to indicate the number of repetitions per transport block 220. In some other examples, the DCI block 215 may include r*N bits as a bitmap, such that each transport block 220 may individually have the number of repetitions scheduled.

In some cases, the DCI block 215 may include an modulation order and coding scheme (MCS) indicator. For a conventional DCI, the MCS indicator may include a varying number of bits (e.g., 4 or 5 bits). In some cases, the number of bits used for the MCS indicator may be based on whether the communications are CE mode AB or NB-IoT. The DCI block 215 may indicate a same MCS for each transport block 220 scheduled by the DCI block 215, such that each of the multiple transport blocks 220 use a same MCS. In some cases, the number of bits used to indicate the MCS, m, may be based on a number of repetitions configured. A large number of transport blocks repetitions may correspond to poor coverage, which may lead to higher MCS values not being used. In some cases, some combinations of larger repetition numbers and high MCS values may be eliminated to reduce overhead for the DCI block 215. In some other examples, the DCI block 215 may include m*N bits, such that the DCI block 215 can individually indicate an MCS for each of the N transport blocks.

The DCI block 215 may also include a frequency hopping indicator. In a conventional DCI, a 1 may indicate that frequency hopping is enabled, and a 0 may indicate that frequency hopping is disabled. For the DCI block 215, a 1 may indicate that frequency hopping is enabled for each of the transport blocks 220, and a 0 may indicate that frequency hopping is disabled for each of the transport blocks 220.

In some cases, some control information of the DCI block 215 may be indicated via other signaling procedures. For example, base station 105-a may indicate to UE 115-a if a common MCS is used or if each transport block 220 has an individual MCS indicated (e.g., using m or m*N bits to indicate the MCS for the multiple transport blocks). Similarly, base station 105-a may indicate whether individual repetitions per transport block or a common number of repetitions are indicated in the DCI block 215 (e.g., N*r or r bits are used to indicate transport block repetition). Base station 105-a may also indicate whether a restriction for MCS values in poor coverage is applied. These configurations for the DCI block 215 may be indicated or semi-statically configured via higher layer signaling such as by RRC signaling. In some cases, semi-static signaling may indicate a use of common MCS or per-transport block MCS or when to restrict MCS, among other configurations or adjustments to parameters or fields of the DCI block 215.

In an example, for N transport blocks 220 scheduled by the DCI block 215, the above configuration may use N bits for the HARQ process ID, N bits for the new data indicator field, and 2N bits for the RV index signaling. If common repetition numbers, MCS, and frequency hopping configurations are used for each of the N transport blocks 220, the DCI block 215 may also include m bits for indicating the MCS, r bits for indicating the repetition number, and 1 bit for indicating frequency hopping. Therefore, the total bits included in the DCI block 215 from these fields may be represented by Equation (1) below.

$$\text{Bits in DCI}=4N+m+r+1 \qquad (1)$$

However, some combinations of fields before encoding may be considered invalid or redundant. Therefore, the DCI block 215 may be configured to omit redundant or invalid configurations as part of the encoding scheme, such that the DCI block 215 may convey the same amount of control information for the multiple transport blocks but by using fewer bits. The DCI block 215 may include one combination of a set of jointly valid combinations for the number of repetitions, the MCS, the frequency hopping configuration, and other fields in some cases. UE 115-a may receive the DCI block 215 and use a decoding algorithm to receive all of the relevant information. UE 115-a parse each field separate to decode the information from the DCI block 215. By decoding a fewer number of bits, UE 115-a may afterward go to sleep or enter a low power state sooner than if the DCI block 215 used more bits to consider redundant or invalid combinations.

Base station 105-a may jointly encode multiple fields of the DCI block 215, such that each possible output of the encoded DCI block is a valid or non-redundant combination. Base station 105-a may generate the DCI block 215 based on a first field, in some cases referred to as the root field. If, for example, base station 105-a first determines the HARQ process ID, the rest of the information conveyed in the DCI block 215 may be based on valid combinations for the selected HARQ process ID. In some other examples, the new data indicator, the RV index, a number of repetitions, or other fields may be selected, where the remainder of the DCI block 215 is encoded based on the selected initial field.

UE 115-a may use successive divisions of the decimal equivalent of the bitstream to process the DCI block 215, which may have been jointly encoded. In some cases, the joint encoding of the DCI block 215 may employ a tree-like structure for the DCI block 215, and UE 115-a may determine different values within the tree and progress along the tree to jointly decode fields within the DCI block 215. UE 115-a may get the children at the same level in the tree-like structure and interpret the remainder from the division at each step as the information contained about that specific node child. This process may continue recursively (e.g., for more children under this child), and so on.

In some examples, base station 105-a may encode the DCI block 215 by omitting redundant combinations of the HARQ process ID bitmap and the new data indicator (NDI) field. If, for example, a HARQ process is not scheduled, new data indicator information for that process may be redundant. Thus, some combinations of the DCI block 215 may be eliminated by jointly signaling the HARQ bitmap and new data indicator field. For example, the DCI block 215 may be encoded such that new data indicator information is omitted for the unscheduled HARQ processes from the DCI block 215. For each HARQ process ID, there may be 3 states. Either the HARQ process is not scheduled by the DCI block 215, the HARQ process is scheduled by the DCI with a new data indicator=0, or the HARQ process is scheduled by the DCI block 215 with a new data indicator=1. Thus, the number of jointly valid combinations is equal to $3^N$. The number of bits to jointly signal the HARQ process IDs+new data indicator is equal to ceil ($\log_2 3^N$). Therefore, the number of bits which are saved by joint signaling across two fields is equal to $2N-\text{ceil}(\log_2 3^N)$. In an example where N=8 transport blocks 220 scheduled by the DCI block 215, this may save 3 bits in the DCI block 215.

In an example technique for eliminating redundant combinations by bundling the HARQ process ID and new data indicator, UE 115-a may convert the bitstream into a decimal number, where the decimal number may range from 0 to $3^N-1$ (e.g., corresponding to the total number of jointly valid combinations for this configuration). UE 115-a may then implement techniques to interpret the jointly encoded bitstream. For example, UE 115-a may implement the following procedure:

Initialize temp = $bin2dec$(ceil($\log_2 3^N$)bit $DCI$)

For $i = 1$ to $N$ $Info_{TB}(i) = \text{mod}(temp, 3)$;

$HARQ_{bitmap}(i) = \min(Info_{TB}(i), 1)$

If $Info_{TB}(i) \neq 0$ $NDI_{bitmap}(i) = \text{mod}(Info_{TB}(i), 2)$;

End If $temp = \text{floor}\left(\dfrac{temp}{3}\right)$

End For

In some cases, the DCI block 215 may be encoded to omit redundant combinations of the HARQ process ID bitmap, new data indicator field, and RV index. For example, if a HARQ process is not scheduled, the DCI block 215 may not need to indicate a new data indicator or RV index indicated for that HARQ process. Therefore, in some cases, the HARQ process ID bitmap, new data indicator field, and RV index may be jointly signaled. The number of jointly valid combinations may be equal to $9^N$, based on eight possible outcomes for each transport block 220 if a HARQ process is scheduled (e.g., from the RV index and the new data indicator (e.g., $2_{NDI}*4_{RV}$)) and the one outcome in case the HARQ process is not scheduled. If a HARQ process is not scheduled, there may not be a new data indicator and RV index signaled for the unscheduled HARQ process. The number of bits used to signal each of the jointly valid combinations may then be equal to ceil ($\log_2 9^N$). The bit savings from joint signaling across these three fields may be equal to 4N− ceil ($\log_2 9^N$). In an example where the DCI block 215 schedules N=8 transport blocks 220, this may save 6 bits in the DCI block 215. In some cases, HARQ bundling may be supported. If HARQ bundling is supported, k HARQ process IDs may be bundled, and N may be replaced by N/k.

In an example technique for omitting redundant combinations by bundling the HARQ process ID, new data indicator, and RV index, UE 115-*a* may convert the bitstream into a decimal number, where the decimal number may range from 0 to $9^N$−1 (e.g., reflecting the total number of jointly valid combinations for this configuration). UE 115-*a* may then implement techniques to interpret the jointly encoded bitstream. For example, UE 115-*a* may implement the following procedure:

Initialize temp = $bin2dec$(ceil($\log_2 9^N$) − bit $DCI$)

For $i = 1$ to $N$ $Info_{TB}(i) = \text{mod}(temp, 9)$;

$HARQ_{bitmap}(i) = \min(Info_{TB}(i), 1)$

If $Info_{TB}(i) \neq 0$, $NDI_{bitmap}(i) = \text{mod}(Info_{TB}(i) - 1, 2)$;

$RV_{value}(i) = \text{mod}\left(\text{floor}\left(\dfrac{Info_{TB}(i) - 1}{2}\right), 4\right)$ End If -continued $temp = \text{floor}\left(\dfrac{temp}{9}\right)$ End For In some cases of the joint encoding, the number of options for the DCI block 215 may be based on one of the fields of the DCI block 215. For example, the joint encoding for the DCI block 215 may be based on a number of repetitions per transport block 220. In an example, each transport block 220 of the multiple transport blocks scheduled by the DCI block 215 use the same repetition number. The repetition number may have an impact on the RV index, the MCS, and the frequency hopping.

For the repetition number's impact on RV index signaling, if the repetition number is greater than or equal to the number of RV indexes, then the RV index pattern across the repetition of each transport block can be implied (for example, in a semi-statically configured pattern of cycling through the RVs) and therefore omitted from the DCI block 215. Thus, base station 105-*a* may not signal the RV index if the repetition number is 4 or greater and there are four or fewer RVs in total that cycle through HARQ repetitions in. Thus, combinations where the repetition number is greater than or equal to 4 and there's an RV indicator per transport block 220 may not be signaled. Instead, the DCI block 215 may just indicate that the repetition number is 4 or greater. If the repetition number is equal to 2, the RV index per transport block 220 may be signal between two possibilities, indicating either {0,1} or {2,3} for the RV index. If the repetition number is equal to 1, then the RV index per transport block 220 may signal all four of the possibilities.

For the repetition number's impact on MCS, if the number of repetitions per transport block 220 is greater than a threshold (e.g., greater than 1), a restriction may be imposed on the possible MCS values. In some cases, the restriction may be referred to as $\Delta_m$, where the restriction changes a number of possible combinations for the MCS. A larger repetition number may imply poor coverage, thus higher MCS values may not be used or may be less likely to be used. This may reduce the number of bits in the DCI block 215 by eliminating cases corresponding to both a large repetition and a large MCS. For example, if the repetition number is greater than the threshold, then the number of possible MCS values signaled may be reduced from $2^m$ to $2^{m-\Delta_m}$. In some other examples, the restriction may be configured inversely, such that if there is a low repetition number, the DCI block 215 may use more bits in a bitmap to indicate the MCS.

The repetition number may also have an impact on the frequency hopping indicator. For example, if the repetition number per transport block is 1, the frequency hopping indicator is redundant. This combination may not be signaled in the DCI block 215. Thus, based on the repetition number, there may be multiple combinations of bitfields which are redundant or invalid. These combinations may not be signaled in or may be omitted from the DCI block 215, which may reduce the number of total possible outcomes for the DCI block 215, thereby reducing the number of bits needed to convey the DCI the multiple transport blocks in the DCI block 215.

Techniques for reducing the number of valid combinations to convey the RV index, MCS, and frequency hopping indicator may be used separately or together with techniques for removing redundant or invalid combinations of the HARQ process ID and new data indicator or the HARQ process, new data indicator, and RV index.

Figure 3:
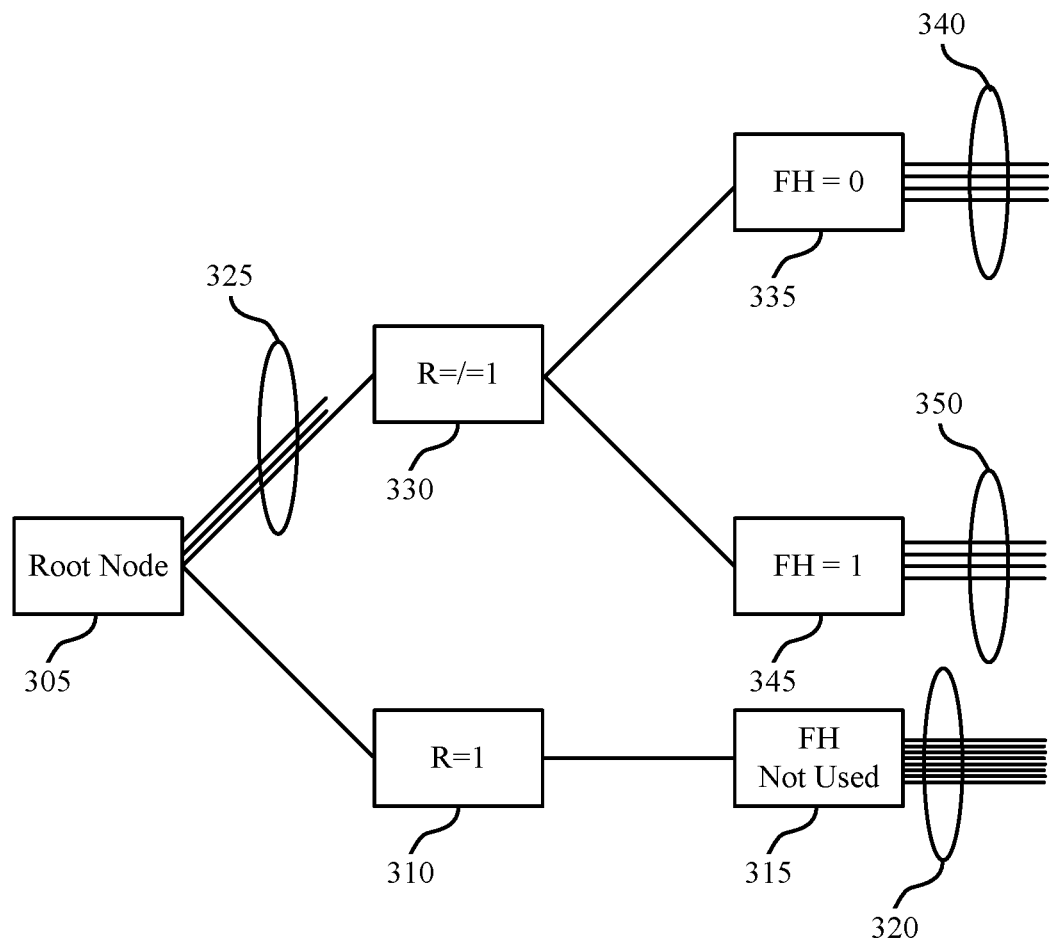
FIG. 3 illustrates an example of a downlink control information block coding tree that supports multi-transport block scheduling in accordance with aspects of the present disclosure.

FIG. 3 illustrates an example of a DCI block coding tree 300 that supports multi-transport block scheduling in accordance with aspects of the present disclosure. In some examples, the DCI block coding tree 300 may implement aspects of wireless communications system 100.

As described in FIG. 2, a base station 105 may transmit DCI to a UE 115 to schedule multiple transport blocks. In order to reduce the size of a DCI block carrying the DCI, the base station 105 may employ a DCI encoding scheme which reduces the total number of used DCI combinations. For example, if a possible combination of two or more fields is redundant or invalid, that combination may not be included in the DCI encoding scheme. By jointly encoding the two or more fields which have invalid or redundant combinations, the jointly encoded field may be configured to not include those redundant or invalid combinations. The DCI block coding tree 300 shows the possible valid DCI combinations based on factors including a repetition number, a frequency hopping indicator, and a modulation and coding scheme.

In some cases, the base station 105 may encode the DCI into a DCI block based on an initial, or root, field of the DCI. The root field may be, for example, a number of repetitions, an RV index, an MCS indicator, a HARQ process ID, or a new data indicator. In some cases, a first few bits of the DCI block may include the initial field. The base station 105 may jointly encode additional fields based on the value of the root field. The joint encoding may remove any redundant or invalid configurations from the DCI block such that the number of bits used to convey the same information is reduced. The DCI block may be smaller (e.g., use fewer bits) than a DCI transmission which just separately encodes a conventional DCI to convey control information for each of the multiple transport blocks, as the DCI block may omit redundant combinations.

The UE 115 may employ similar techniques to decode the DCI block. The UE 115 may identify the root field, identify the value for the root field, and, in some cases, traverse a "tree" to decode the DCI block based on the value of the root field. For example, the UE 115 may determine how to decode a second field of the DCI block based on the value of the root parameter, then the UE 115 may determine how to decode a third field of the DCI based on the value of the second field. As the UE 115 identifies values for different parameter or different fields, the UE 115 may decode the DCI as it was encoded by the base station 105.

In the example of the DCI block coding tree 300, the root field may be the number of repetitions. In some cases, the number of repetitions may be common for each of the multiple transport blocks scheduled by the DCI. For example, each transport block of the multiple transport blocks may be configured to be repeated as many times as indicated by the repetition number. In this example, the threshold for the restriction value may be based on there being two or more repetitions configured. Thus, if the repetition number is 1, the restriction value may not be used, and the MCS may use m bits. Otherwise, the MCS may use $m-\Delta_m$ bits. If the number of repetitions is equal to 1, the frequency hopping indicator may be redundant and may not be signaled. In this example, the DCI may schedule 8 transport blocks, include 2 bits for a repetition number (e.g., r=2), include 4 bits for an MCS (e.g., m=4), and have an MCS restriction value, $\Delta_m$, of 2, which is used when the repetition number is 2 or greater.

A root node 305 may be traversed based on the root field. In this example, the root field of this tree may be the repetition number. However, in other examples, the root field may be based on another field of the DCI. Based on r having two bits, there may be four possible paths to four different nodes, which may correspond to different possible repetition numbers. In some cases, a node may have a varying number of outputs based on inputs to previous nodes.

For example, node 310 may be based on there being one repetition of the transport blocks. If the transport blocks are only repeated one time, then the frequency hopping indicator may not be used, as the frequency hopping indicator may be used to indicate whether the repeated transport blocks are transmitted using frequency hopping. Thus, there is one path to node 315.

There may be multiple outputs 320 from node 315 based on the number of bits supported to indicate the MCS. Based on the repetition number being low (e.g., one repetition), the MCS restriction may not be used at node 315. Therefore, with 4 bits supported for the MCS, there may be 16 (e.g., $2^4$) outputs of DCI configurations from node 315.

There may be three other cases where the repetition number is greater than 1. These cases are shown by branches 325, which includes three branches for 2 repetitions, 3 repetitions, and 4 repetitions of the transport blocks. Node 330 may correspond to one of the branches 325.

There may be two branches from the node 330, where frequency hopping is either turned off or frequency hopping is turned on. At node 335, frequency hopping is turned off. At node 345, frequency hopping is turned on. For both of the nodes 335 and 345, there may be a fewer number of bits supported for indicating MCS, which may correspond to fewer MCS possibilities, based on these nodes having a higher repetition number. For example, because the repetition number is greater than 1, the MCS restriction may be active. Thus, node 335 and node 345 may have two bits to use to indicate the MCS, where m=4, $\Delta_m$=2, and $m-\Delta_m$=2. As shown, branches 340 may have four outputs and branches 350 may have four outputs.

Each of the three branches in the branches 325 may include similar nodes to the nodes 330, 335, and 345. Therefore, each of the three branches 325 may include eight possible outputs. These 24 possible outputs for a repetition number greater than 1, with the 16 outputs corresponding to a repetition equal to 1, provide 40 total jointly encoded combinations. Generally, the number of jointly valid combinations of the number of repetitions, frequency hopper indicator, and MCS may be equal to $2^m+(2^r-1)*2*(2^{m-\Delta_m})$ when the restriction threshold is active for a repetition number of 2 and greater.

These techniques for reducing the number of DCI configurations based on the root field may be combined with the techniques for reducing redundant combinations based on HARQ process ID, new data indicator, and RV index. For example, as described in FIG. 2, there may be $9^N$ valid combinations for a jointly combined HARQ process ID, new data indicator, and RV index, where N is the number of transport blocks scheduled by the DCI. Thus, there may be $9^N(2^m+(2^r-1)*2*(2^{m-\Delta_m}))$ total combinations across the number of repetitions, frequency hopping indicator, MCS, HARQ process ID, new data indicator, and RV index. The total bit savings may be determined by subtracting the maximum number of bits used to express this number from the maximum number of bits used to express the DCI. For example, the bit savings in the DCI=4N+m+r+1− ceil(log$_2$ ($9^N*(2^m+(2^r-1)*2*(2^{m-\Delta_m}))$)). For the above configuration of N=8, m=4, r=2, $\Delta_m$=2, the bit savings in DCI may be 8 bits.

In a second example (not shown), the possible number of repetitions may be any of the set of {1, 2, x1, x2, x3, x4, x5, x6}, where {x1, ..., x6}≥4. In this example, r may be equal to 3. If the repetition number is equal to 1, the MCS may have $2^m$ possibilities. Otherwise, the MCS may be $2^{m-\Delta_m}$ possibilities. If the repetition number is equal to 1, the frequency hopper indicator may be redundant and not signaled.

If the repetition number of the second example is 1, the DCI may include two bits worth of information per transport block for an RV index. If the repetition number of the second example is 2, the DCI may include one bit worth of information per transport block for an RV index. If the repetition number of the second example is neither 1 or 2, then the repetition number is four or greater. Thus, the DCI may not include any information for an RV index, as each RV index may be cycled through at least once.

Therefore, the total joint valid combinations for the second example across the repetition numbers, frequency hopping indicator, MCS, HARQ process ID, new data indicator, and RV indexes may be equal to $9^N*2^m+5^N*2*2^{m-\Delta_m}+(2^r-2)*3^N 2*2^{m-\Delta_m}$. The value of $9^N*2^m$ may correspond to a repetition value of 1. The value of $5^N*2*2^{m-\Delta_m}$ may correspond to a repetition value of 2. The value of $(2^r-2)*3^N*2*2^{m-\Delta_m}$ may correspond to a repetition value of any of x1 through x6 (e.g., 4 or greater). Therefore, the bit savings in this scenario may be equal to $4N+m+r+1-\text{ceil}(\log_2(9^N*2^m+5^N*2*2^{m-\Delta_m}m+(2^r-2)*3^N*2*2^{m-\Delta_m}))$. In an example configuration where N=8, m=4, r=3, and $\Delta_m$, =2, these techniques can save 10 bits in the DCI. In some cases, the different additives of the bit savings (e.g., the values corresponding to the different repetition numbers) may be referred to as types.

Figure 4:
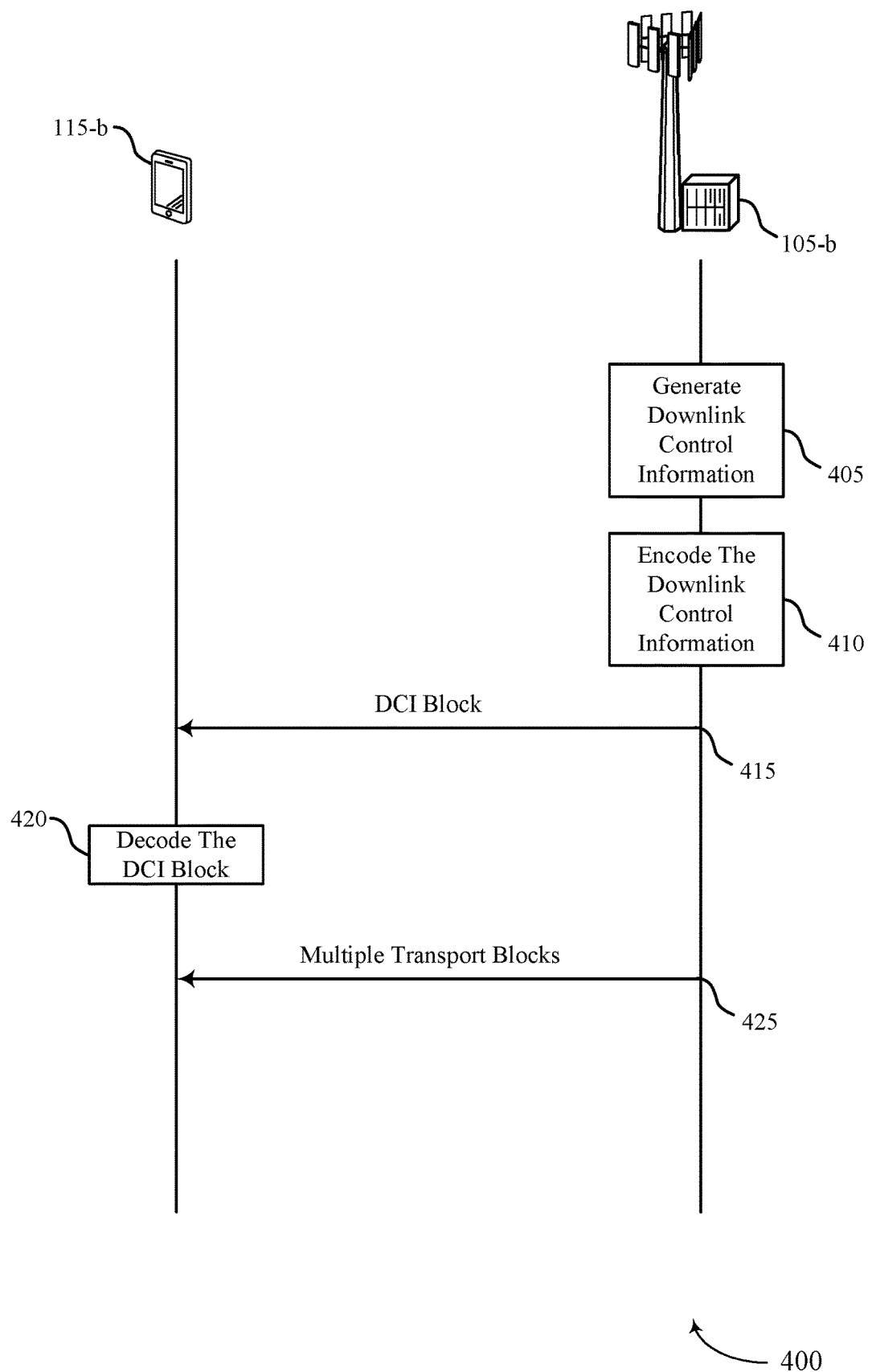
FIG. 4 illustrates an example of a process flow that supports multi-transport block scheduling in accordance with aspects of the present disclosure.

FIG. 4 illustrates an example of a process flow 400 that supports multi-transport block scheduling in accordance with aspects of the present disclosure. In some examples, process flow 400 may implement aspects of wireless communications system 100. Process flow 400 may include UE 115-b and base station 105-b, which may be respective examples of a UE 115 and a base station 105 described herein.

At 405, base station 105-b may generate DCI to schedule multiple transport blocks for a UE, the DCI including a set of fields. At 410, base station 105-b may encode the DCI into a DCI block for the multiple transport blocks, where at least two fields of the DCI are jointly encoded according to an encoding scheme, where each possible output of the encoding scheme corresponds to a jointly valid combination of the at least two fields At 415, base station 105-b may transmit the DCI block for the multiple transport blocks to UE 115-b. UE 115-b may receive the DCI block including the DCI for the multiple transport blocks.

At 420, UE 115-b may decode the DCI block to obtain the DCI for the multiple transport blocks, where at least two fields of the DCI are jointly decoded according to an encoding scheme, where each possible output of the encoding scheme corresponds to a jointly valid combination of the at least two fields. For example, the at least two fields may include a HARQ process identifier field and a new data indicator field and decoding the DCI may include omitting new data indicator information from the new data indicator field for unscheduled HARQ processes from the downlink control information block. In some cases, the at least two fields further include an RV index field and decoding the downlink control information includes omitting RV index information for unscheduled HARQ processes from the DCI block. At 425, UE 115-b may receive the multiple transport blocks from a base station based on the DCI.

Figure 5:
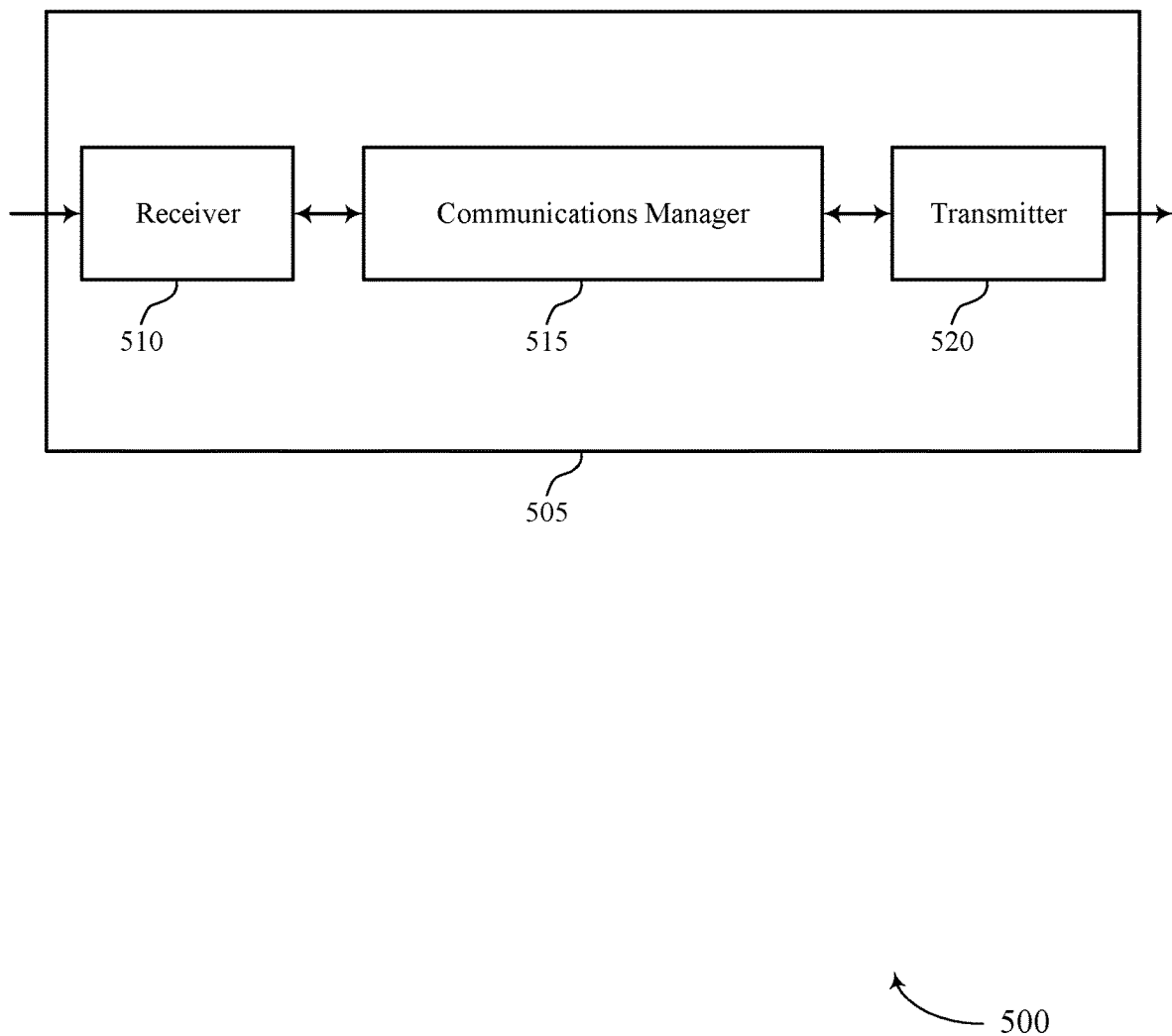
FIGS. 5 and 6 show block diagrams of devices that support multi-transport block scheduling in accordance with aspects of the present disclosure.

FIG. 5 shows a block diagram 500 of a device 505 that supports multi-transport block scheduling in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multi-transport block scheduling, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a downlink control information block including downlink control information for a set of transport blocks scheduled for the UE, where the downlink control information includes a set of fields, decode the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields, and receive the set of transport blocks from a base station based on the downlink control information. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
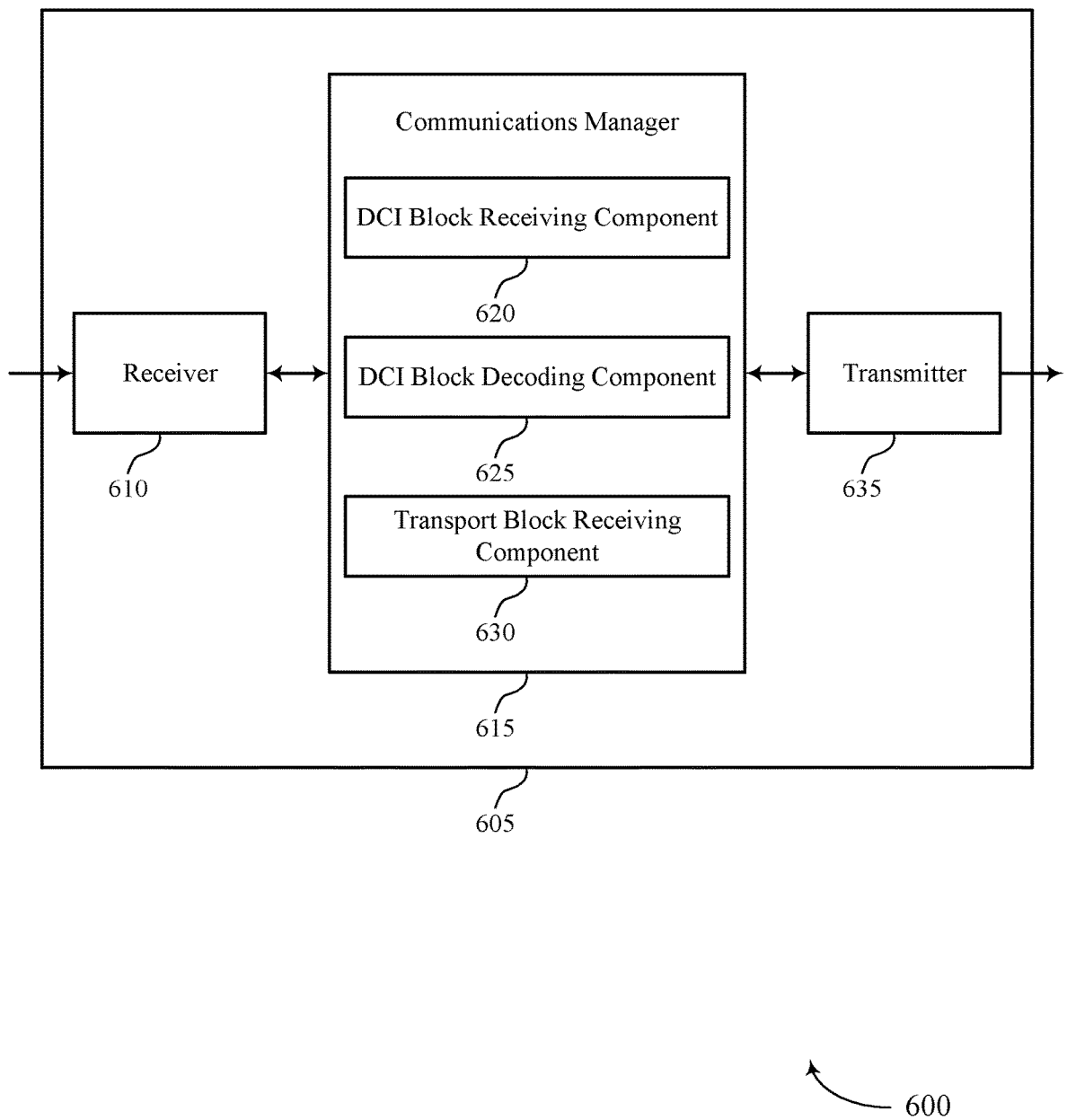

FIG. 6 shows a block diagram 600 of a device 605 that supports multi-transport block scheduling in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to multi-transport block scheduling, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a DCI block receiving component 620, a DCI block decoding component 625, and a transport block receiving component 630. The communications manager 615 may be an example of aspects of the communications manager 810 described herein.

The DCI block receiving component 620 may receive a downlink control information block including downlink control information for a set of transport blocks scheduled for the UE, where the downlink control information includes a set of fields. The DCI block decoding component 625 may decode the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields. The transport block receiving component 630 may receive the set of transport blocks from a base station based on the downlink control information.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
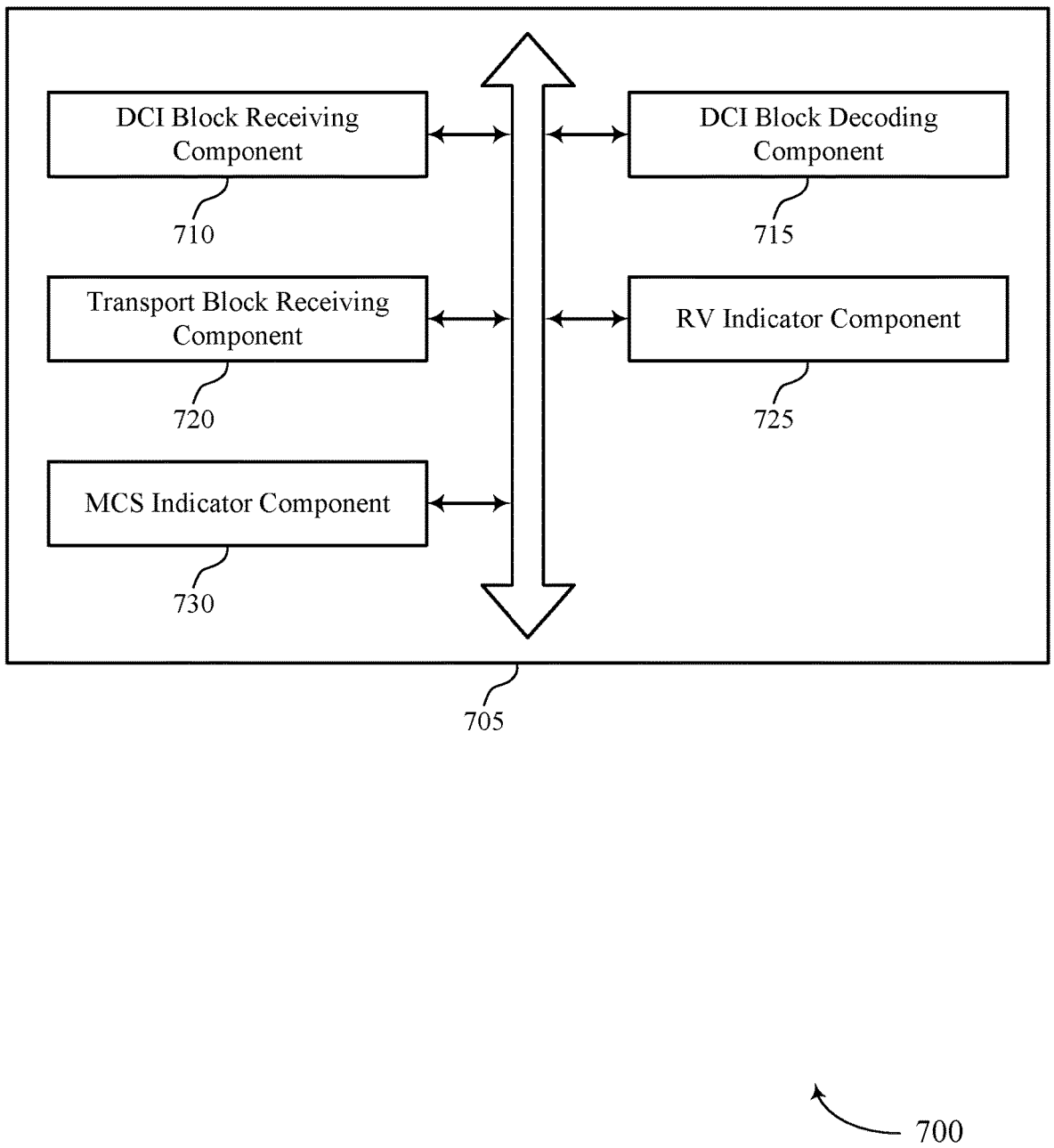
FIG. 7 shows a block diagram of a communications manager that supports multi-transport block scheduling in accordance with aspects of the present disclosure.

FIG. 7 shows a block diagram 700 of a communications manager 705 that supports multi-transport block scheduling in accordance with aspects of the present disclosure. The communications manager 705 may be an example of aspects of a communications manager 515, a communications manager 615, or a communications manager 810 described herein. The communications manager 705 may include a DCI block receiving component 710, a DCI block decoding component 715, a transport block receiving component 720, a RV indicator component 725, and a MCS indicator component 730. Each of these modules may communicate, directly or indirectly, with one another (e.g., via one or more buses).

The DCI block receiving component 710 may receive a downlink control information block including downlink control information for a set of transport blocks scheduled for the UE, where the downlink control information includes a set of fields.

The DCI block decoding component 715 may decode the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields. In some examples, the DCI block decoding component 715 may omit new data indicator information from the new data indicator field for unscheduled HARQ processes from the downlink control information block.

In some examples, the DCI block decoding component 715 may omit redundancy version index information for unscheduled HARQ processes from the downlink control information block. In some examples, the DCI block decoding component 715 may omit the frequency hopping indicator field if a number of repetitions per transport block signaled by the number of repetitions field is equal to 1.

In some cases, the HARQ process identifier field includes a number of bits equal to a number of transport blocks scheduled by the downlink control information. In some cases, the new data indicator field includes a number of bits equal to a number of transport blocks scheduled by the downlink control information. The transport block receiving component 720 may receive the set of transport blocks from a base station based on the downlink control information. In some examples, the transport block receiving component 720 may receive from the base station an indication of whether the number of repetitions field is to signal the number of repetitions that is common to each transport block of the set of transport blocks or the bitmap separately indicating the modulation and coding scheme for each transport block of the set of transport blocks. In some cases, the number of repetitions field includes one or more of a number of repetitions that is common to each transport block of the set of transport blocks or a bitmap separately indicating a number of repetitions for each transport block of the set of transport blocks.

The RV indicator component 725 may set a size of the redundancy version indicator field based on the number of repetitions per transport block signaled by the number of repetitions field. In some examples, the RV indicator component 725 may set the size of the redundancy version indicator field to 0 bits if the number of repetitions per transport block is greater than or equal to 4, or setting the size of the redundancy version indicator field to 1 bit if the number of repetitions per transport block is equal to 2, or setting the size of the redundancy version indicator field to 2 bits if the number of repetitions per transport block is equal to 1. In some cases, the set of fields includes a number of repetitions field configured to signal a number of repetitions per transport block of the set of transport blocks.

The MCS indicator component 730 may set a size of the modulation and coding scheme indicator field based on one or more of: a number of repetitions per transport block signaled by the number of repetitions field or a channel condition. In some examples, the MCS indicator component 730 may receive from the base station a message indicating a restriction of values for the modulation and coding scheme indicator field based on the channel condition.

In some examples, the MCS indicator component 730 may receive from the base station an indication of whether the modulation and coding scheme indicator is to signal the modulation and coding scheme that is common to each transport block of the set of transport blocks or the bitmap separately indicating the modulation and coding scheme for each transport block of the set of transport blocks. n some cases, a modulation and coding scheme that is common to each transport block of the set of transport blocks or a bitmap separately indicating a modulation and coding scheme for each transport block of the set of transport blocks.

Figure 8:
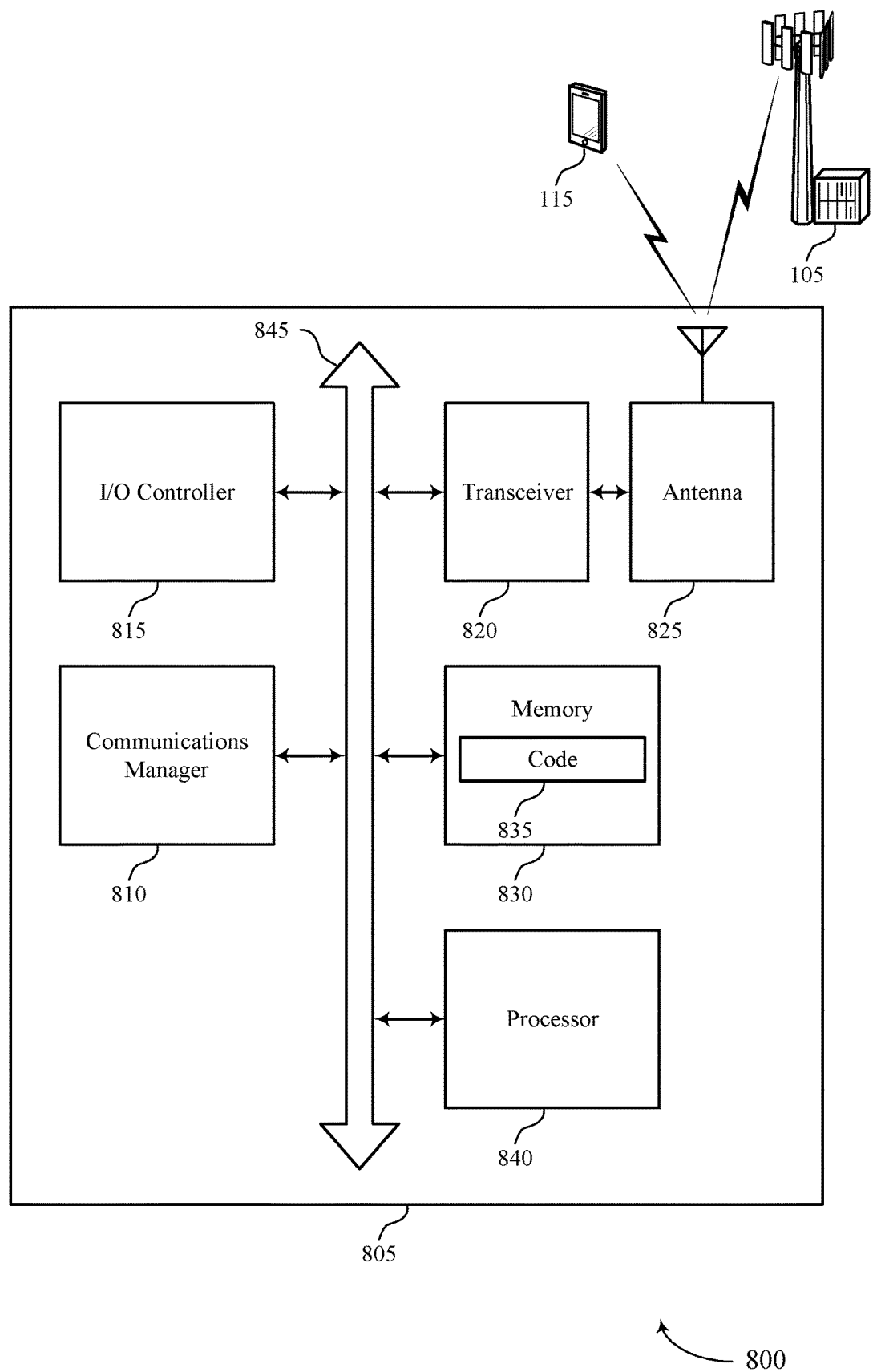
FIG. 8 shows a diagram of a system including a device that supports multi-transport block scheduling in accordance with aspects of the present disclosure.

FIG. 8 shows a diagram of a system 800 including a device 805 that supports multi-transport block scheduling in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a downlink control information block including downlink control information for a set of transport blocks scheduled for the UE, where the downlink control information includes a set of fields, decode the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields, and receive the set of transport blocks from a base station based on the downlink control information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-transport block scheduling).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
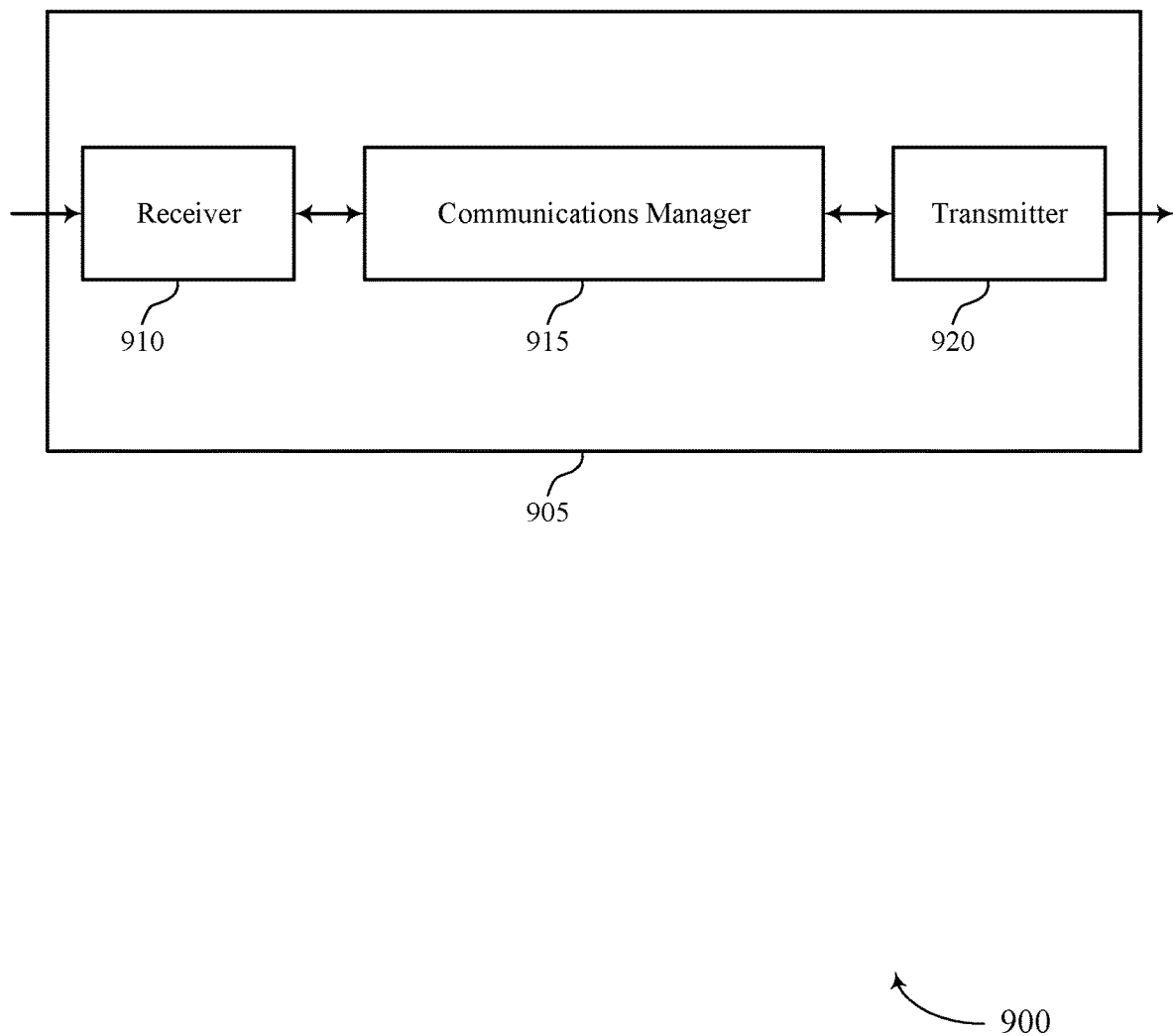
FIGS. 9 and 10 show block diagrams of devices that support multi-transport block scheduling in accordance with aspects of the present disclosure.

FIG. 9 shows a block diagram 900 of a device 905 that supports multi-transport block scheduling in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multi-transport block scheduling, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may generate downlink control information to schedule a set of transport blocks for a UE, the downlink control information including a set of fields, encode the downlink control information into a downlink control information block for the set of transport blocks, where at least two fields of the downlink control information are jointly encoded according to an encoding scheme, where each possible output of the encoding scheme corresponds to a jointly valid combination of the at least two fields, transmit the downlink control information block for the set of transport blocks to the UE, and transmit the set of transport blocks to the UE based on the downlink control information. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
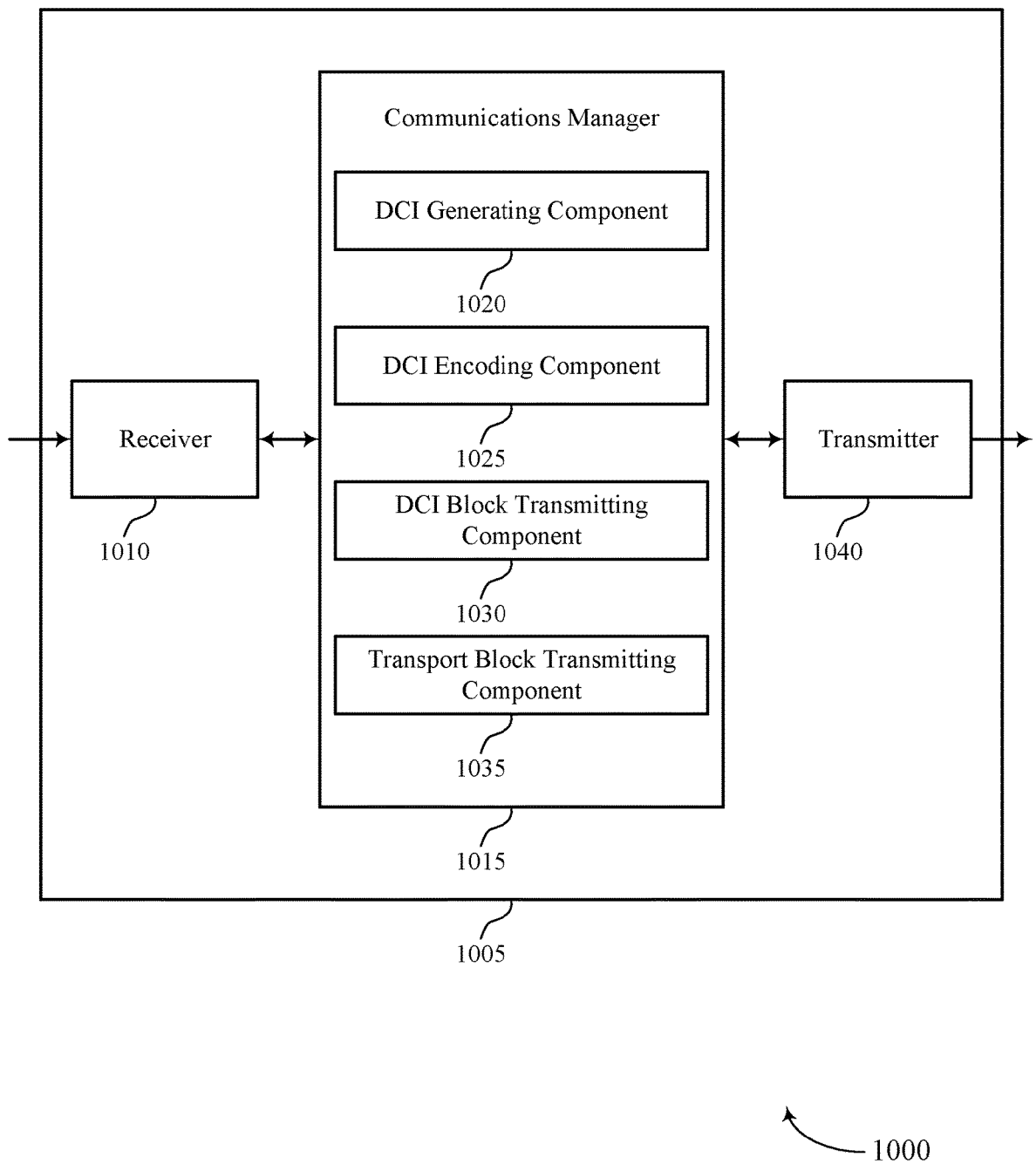

FIG. 10 shows a block diagram 1000 of a device 1005 that supports multi-transport block scheduling in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-transport block scheduling, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a DCI generating component 1020, a DCI encoding component 1025, a DCI block transmitting component 1030, and a transport block transmitting component 1035. The communications manager 1015 may be an example of aspects of the communications manager 1210 described herein.

The DCI generating component 1020 may generate downlink control information to schedule a set of transport blocks for a UE, the downlink control information including a set of fields. The DCI encoding component 1025 may encode the downlink control information into a downlink control information block for the set of transport blocks, where at least two fields of the downlink control information are jointly encoded according to an encoding scheme, where each possible output of the encoding scheme corresponds to a jointly valid combination of the at least two fields. The DCI block transmitting component 1030 may transmit the downlink control information block for the set of transport blocks to the UE. The transport block transmitting component 1035 may transmit the set of transport blocks to the UE based on the downlink control information.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
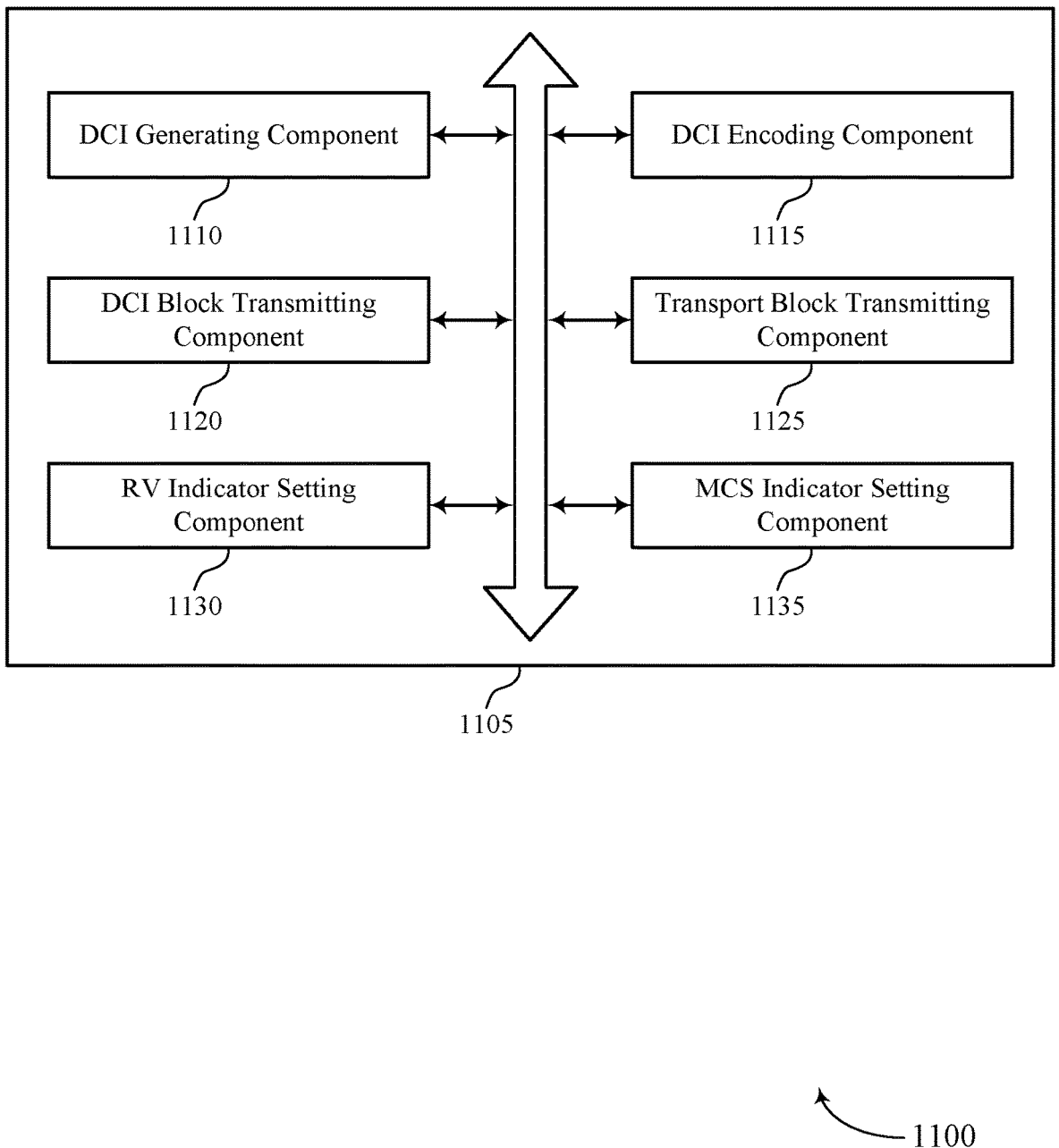
FIG. 11 shows a block diagram of a communications manager that supports multi-transport block scheduling in accordance with aspects of the present disclosure.

FIG. 11 shows a block diagram 1100 of a communications manager 1105 that supports multi-transport block scheduling in accordance with aspects of the present disclosure. The communications manager 1105 may be an example of aspects of a communications manager 915, a communications manager 1015, or a communications manager 1210 described herein. The communications manager 1105 may include a DCI generating component 1110, a DCI encoding component 1115, a DCI block transmitting component 1120, a transport block transmitting component 1125, a RV indicator setting component 1130, and a MCS indicator setting component 1135. Each of these modules may communicate, directly or indirectly, with one another (e.g., via one or more buses).

The DCI generating component 1110 may generate downlink control information to schedule a set of transport blocks for a UE, the downlink control information including a set of fields. In some cases, the set of fields includes a number of repetitions field configured to signal a number of repetitions per transport block of the set of transport blocks.

The DCI encoding component 1115 may encode the downlink control information into a downlink control information block for the set of transport blocks, where at least two fields of the downlink control information are jointly encoded according to an encoding scheme, where each possible output of the encoding scheme corresponds to a jointly valid combination of the at least two fields. In some examples, the DCI encoding component 1115 may omit new data indicator information from the new data indicator field for unscheduled HARQ processes from the downlink control information block.

In some examples, the DCI encoding component 1115 may omit redundancy version index information for unscheduled HARQ processes from the downlink control information block. In some examples, the DCI encoding component 1115 may omit the frequency hopping indicator field if a number of repetitions per transport block signaled by the number of repetitions field is equal to 1. In some cases, the HARQ process identifier field includes a number of bits equal to a number of transport blocks scheduled by the downlink control information. In some cases, the new data indicator field includes a number of bits equal to a number of transport blocks scheduled by the downlink control information.

The DCI block transmitting component 1120 may transmit the downlink control information block for the set of transport blocks to the UE. The transport block transmitting component 1125 may transmit the set of transport blocks to the UE based on the downlink control information. In some examples, the transport block transmitting component 1125 may transmit to the UE an indication of whether the number of repetitions field is to signal the number of repetitions that is common to each transport block of the set of transport blocks or the bitmap separately indicating the modulation and coding scheme for each transport block of the set of transport blocks. In some cases, the number of repetitions field includes one or more of: a number of repetitions that is common to each transport block of the set of transport blocks or a bitmap separately indicating a number of repetitions for each transport block of the set of transport blocks.

The RV indicator setting component 1130 may set a size of the redundancy version indicator field based on the number of repetitions per transport block signaled by the number of repetitions field. In some examples, the RV indicator setting component 1130 may set the size of the redundancy version indicator field to 0 bits if the number of repetitions per transport block is greater than or equal to 4, or setting the size of the redundancy version indicator field to 1 bit if the number of repetitions per transport block is equal to 2, or setting the size of the redundancy version indicator field to 2 bits if the number of repetitions per transport block is equal to 1.

The MCS indicator setting component 1135 may set a size of the modulation and coding scheme indicator field based on one or more of: a number of repetitions per transport block signaled by the number of repetitions field or a channel condition. In some examples, the MCS indicator setting component 1135 may transmit to the UE a message indicating a restriction of values for the modulation and coding scheme indicator field based on the channel condition.

In some examples, the MCS indicator setting component 1135 may transmit to the UE an indication of whether the modulation and coding scheme indicator is to signal the modulation and coding scheme that is common to each transport block of the set of transport blocks or the bitmap separately indicating the modulation and coding scheme for each transport block of the set of transport blocks. In some cases, the modulation and coding scheme indicator field signals one or more of: a modulation and coding scheme that is common to each transport block of the set of transport blocks or a bitmap separately indicating a modulation and coding scheme for each transport block of the set of transport blocks.

Figure 12:
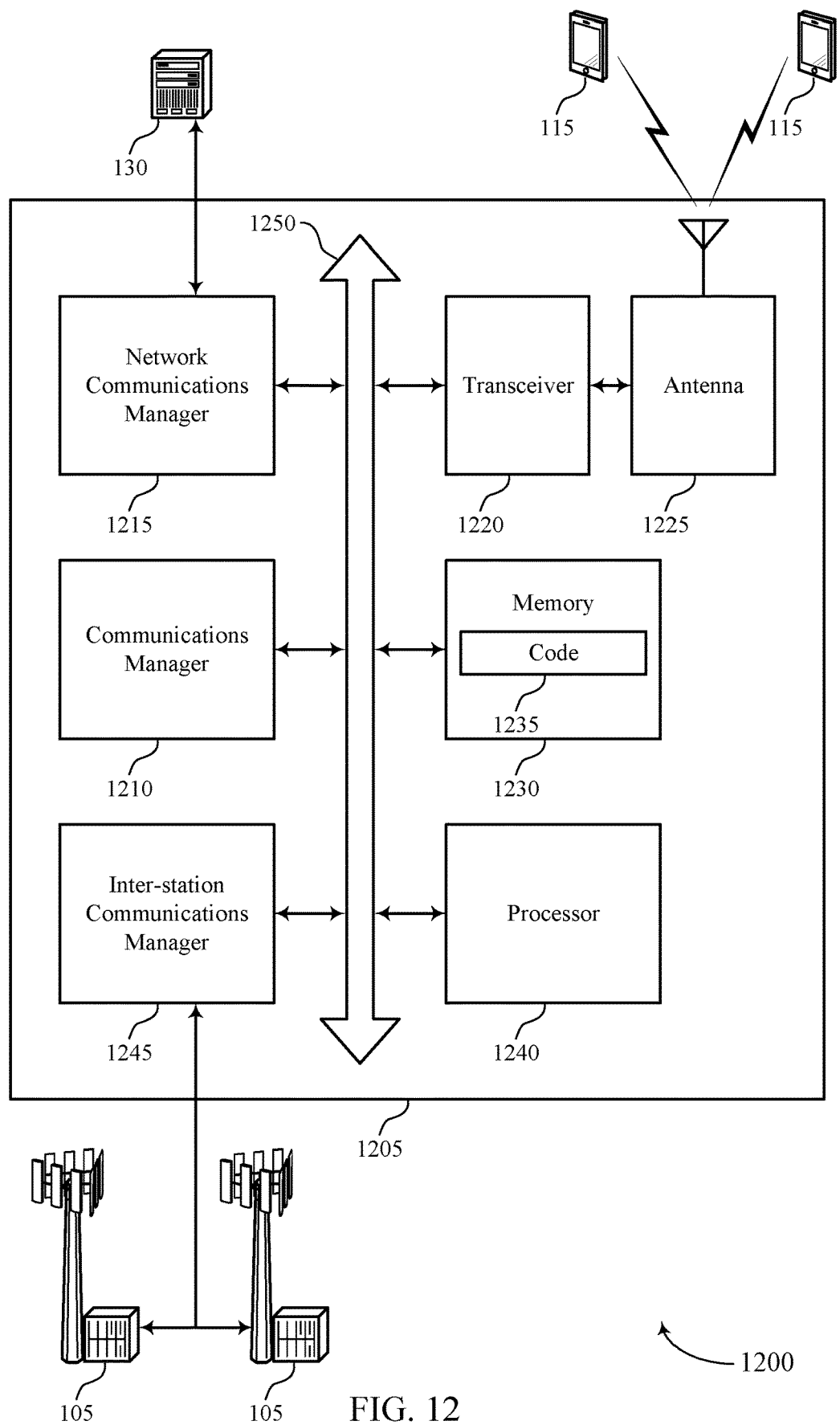
FIG. 12 shows a diagram of a system including a device that supports multi-transport block scheduling in accordance with aspects of the present disclosure.

FIG. 12 shows a diagram of a system 1200 including a device 1205 that supports multi-transport block scheduling in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may generate downlink control information to schedule a set of transport blocks for a UE, the downlink control information including a set of fields, encode the downlink control information into a downlink control information block for the set of transport blocks, where at least two fields of the downlink control information are jointly encoded according to an encoding scheme, where each possible output of the encoding scheme corresponds to a jointly valid combination of the at least two fields, transmit the downlink control information block for the set of transport blocks to the UE, and transmit the set of transport blocks to the UE based on the downlink control information.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting multi-transport block scheduling).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
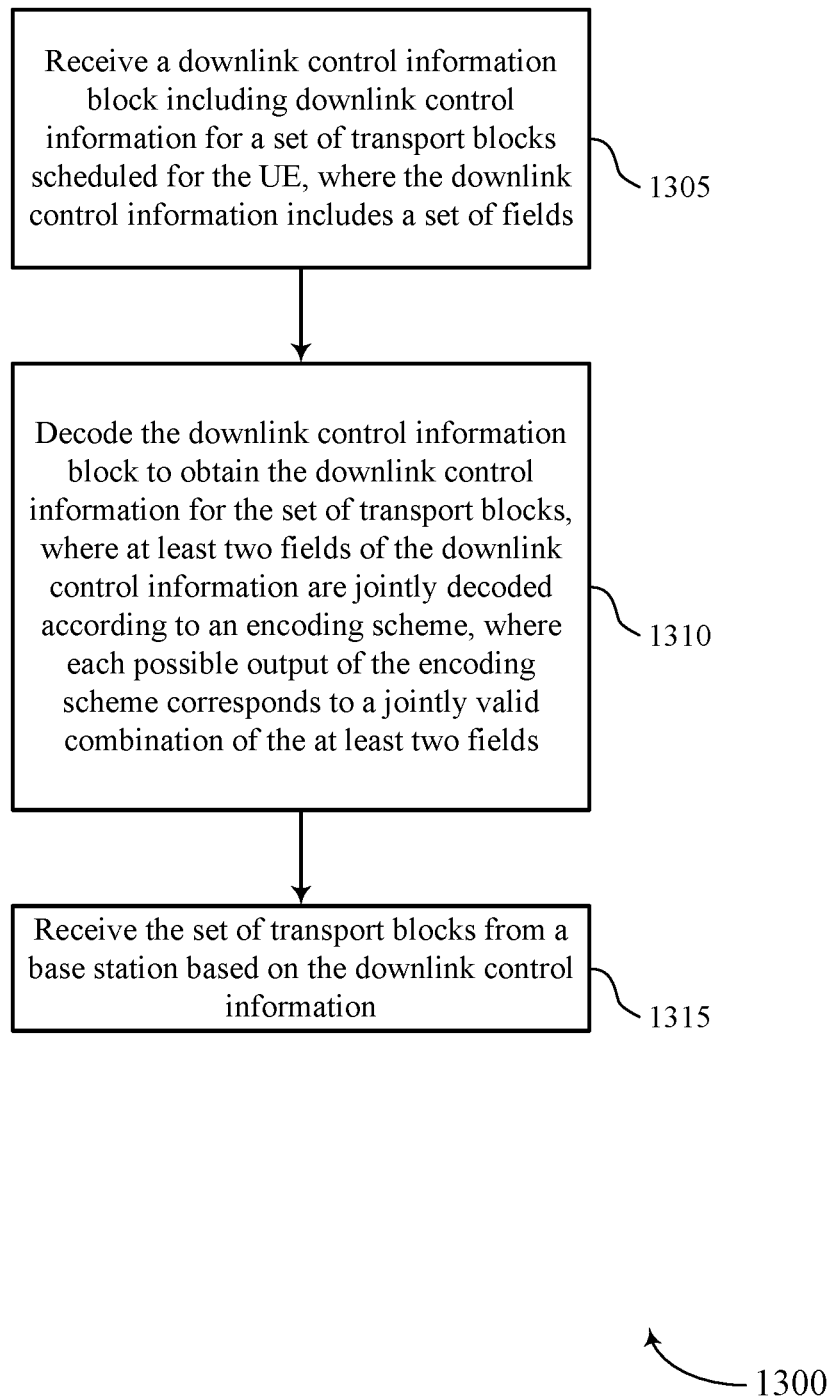
FIGS. 13 and 14 show flowcharts illustrating methods that support multi-transport block scheduling in accordance with aspects of the present disclosure.

FIG. 13 shows a flowchart illustrating a method 1300 that supports multi-transport block scheduling in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a downlink control information block including downlink control information for a set of transport blocks scheduled for the UE, where the downlink control information includes a set of fields. The operations of 1305 may be performed according to the methods described herein. In some examples, aspects of the operations of 1305 may be performed by a DCI block receiving component as described with reference to FIGS. 5 through 8.

At 1310, the UE may decode the downlink control information block to obtain the downlink control information for the set of transport blocks, where at least two fields of the downlink control information are jointly decoded according to an encoding scheme, where each possible output of the encoding scheme corresponds to a jointly valid combination of the at least two fields. The operations of 1310 may be performed according to the methods described herein. In some examples, aspects of the operations of 1310 may be performed by a DCI block decoding component as described with reference to FIGS. 5 through 8.

At 1315, the UE may receive the set of transport blocks from a base station based on the downlink control information. The operations of 1315 may be performed according to the methods described herein. In some examples, aspects of the operations of 1315 may be performed by a transport block receiving component as described with reference to FIGS. 5 through 8.

Figure 14:
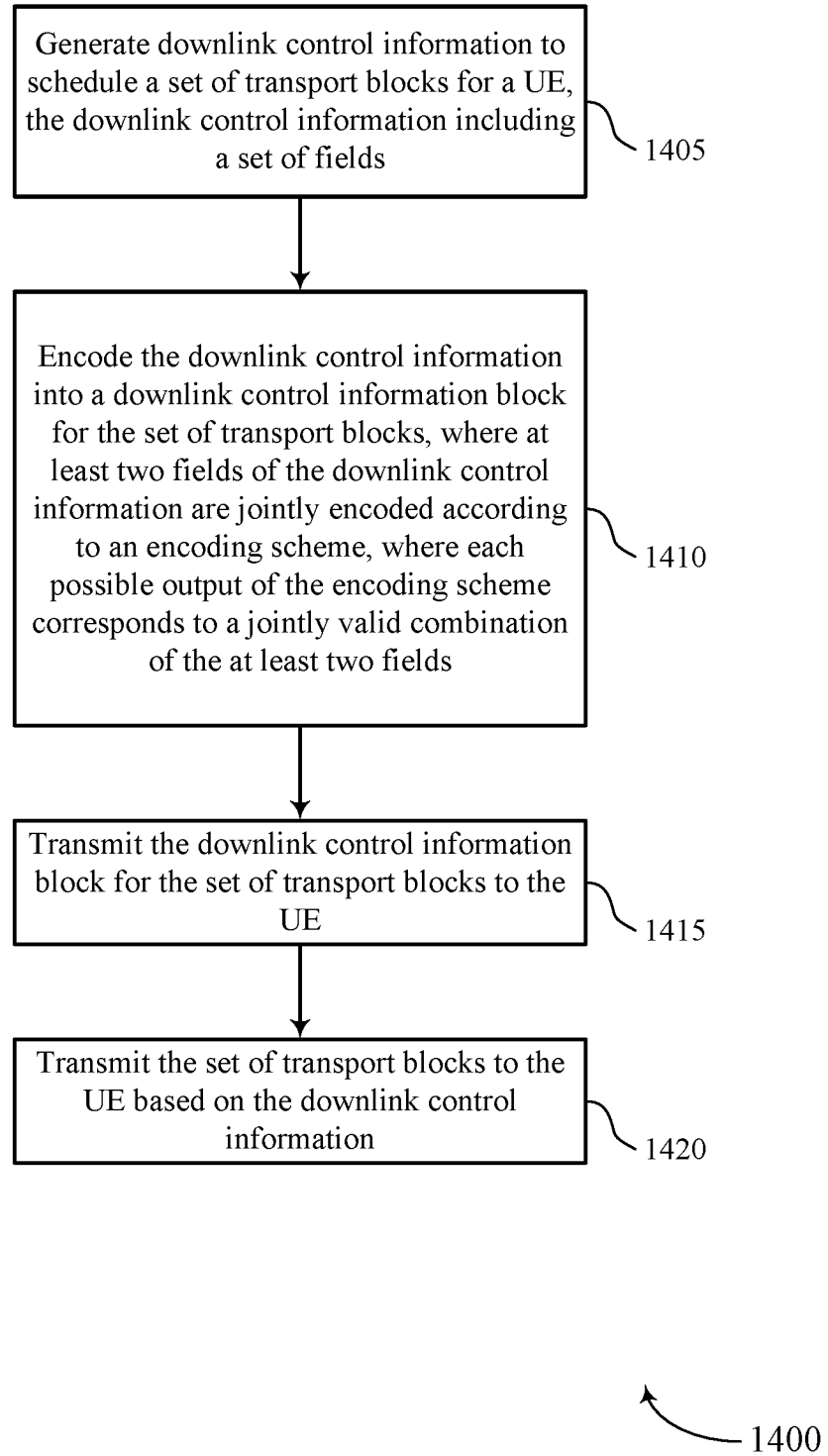

FIG. 14 shows a flowchart illustrating a method 1400 that supports multi-transport block scheduling in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may generate downlink control information to schedule a set of transport blocks for a UE, the downlink control information including a set of fields. The operations of 1405 may be performed according to the methods described herein. In some examples, aspects of the operations of 1405 may be performed by a DCI generating component as described with reference to FIGS. 9 through 12.

At 1410, the base station may encode the downlink control information into a downlink control information block for the set of transport blocks, where at least two fields of the downlink control information are jointly encoded according to an encoding scheme, where each possible output of the encoding scheme corresponds to a jointly valid combination of the at least two fields. The operations of 1410 may be performed according to the methods described herein. In some examples, aspects of the operations of 1410 may be performed by a DCI encoding component as described with reference to FIGS. 9 through 12.

At 1415, the base station may transmit the downlink control information block for the set of transport blocks to the UE. The operations of 1415 may be performed according to the methods described herein. In some examples, aspects of the operations of 1415 may be performed by a DCI block transmitting component as described with reference to FIGS. 9 through 12.

At 1420, the base station may transmit the set of transport blocks to the UE based on the downlink control information. The operations of 1420 may be performed according to the methods described herein. In some examples, aspects of the operations of 1420 may be performed by a transport block transmitting component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a downlink control information block comprising downlink control information for a plurality of transport blocks scheduled for reception or transmission by the UE, wherein the downlink control information comprises a plurality of fields;
    decoding, based on an encoding scheme, the downlink control information block to obtain the downlink control information for the plurality of transport blocks, wherein at least two fields of the downlink control information are jointly decoded according to the encoding scheme, wherein each possible output of the encoding scheme corresponds to a jointly valid combination of the at least two fields; and receiving the plurality of transport blocks from a base station or transmitting the plurality of transport blocks to the base station based at least in part on the downlink control information.

2. The method of claim 1, wherein the at least two fields comprise a hybrid automatic repeat request (HARQ) process identifier field and a new data indicator field, and decoding the downlink control information comprises:

omitting new data indicator information from the new data indicator field for unscheduled HARQ processes from the downlink control information block.

3. The method of claim 2, wherein the at least two fields further comprise a redundancy version index field, and decoding the downlink control information further comprises:

omitting redundancy version index information for unscheduled HARQ processes from the downlink control information block.

4. The method of claim 2, wherein the HARQ process identifier field comprises a number of bits equal to a number of transport blocks scheduled by the downlink control information.

5. The method of claim 2, wherein the new data indicator field comprises a number of bits equal to a number of transport blocks scheduled by the downlink control information.

6. The method of claim 1, wherein the plurality of fields comprises a number of repetitions field configured to signal a number of repetitions per transport block of the plurality of transport blocks.

7. The method of claim 6, wherein the at least two fields comprise the number of repetitions field and a redundancy version indicator field, and decoding the downlink control information comprises:

setting a size of the redundancy version indicator field based at least in part on the number of repetitions per transport block signaled by the number of repetitions field.

8. The method of claim 7, wherein setting the size of the redundancy version indicator field comprises one or more of:

setting the size of the redundancy version indicator field to 0 bits if the number of repetitions per transport block is greater than or equal to 4, or setting the size of the redundancy version indicator field to 1 bit if the number of repetitions per transport block is equal to 2, or setting the size of the redundancy version indicator field to 2 bits if the number of repetitions per transport block is equal to 1.

9. The method of claim 6, wherein the at least two fields comprise the number of repetitions field and a modulation and coding scheme indicator field, and decoding the downlink control information comprises:

setting a size of the modulation and coding scheme indicator field based at least in part on one or more of: a number of repetitions per transport block signaled by the number of repetitions field or a channel condition.

10. The method of claim 9, further comprising:

receiving from the base station a message indicating a restriction of values for the modulation and coding scheme indicator field based at least in part on the channel condition.

11. The method of claim 9, wherein the modulation and coding scheme indicator field signals one or more of: a modulation and coding scheme that is common to each transport block of the plurality of transport blocks or a bitmap separately indicating a modulation and coding scheme for each transport block of the plurality of transport blocks.

12. The method of claim 11, further comprising:

receiving from the base station an indication of whether the modulation and coding scheme indicator is to signal the modulation and coding scheme that is common to each transport block of the plurality of transport blocks or the bitmap separately indicating the modulation and coding scheme for each transport block of the plurality of transport blocks.

13. The method of claim 6, wherein the at least two fields comprise the number of repetitions field and a frequency hopping indicator field, and decoding the downlink control information comprises:

omitting the frequency hopping indicator field if a number of repetitions per transport block signaled by the number of repetitions field is equal to 1.

14. The method of claim 6, wherein the number of repetitions field comprises one or more of a number of repetitions that is common to each transport block of the plurality of transport blocks or a bitmap separately indicating a number of repetitions for each transport block of the plurality of transport blocks.

15. The method of claim 14, further comprising:

receiving from the base station an indication of whether the number of repetitions field is to signal the number of repetitions that is common to each transport block of the plurality of transport blocks or the bitmap separately indicating the modulation and coding scheme for each transport block of the plurality of transport blocks.

16. An apparatus for wireless communications at a user equipment (UE), comprising:

a processor,
memory coupled with the processor; and
instructions stored in the memory and executable by the processor to cause the apparatus to:

receive a downlink control information block comprising downlink control information for a plurality of transport blocks scheduled for reception or transmission by the UE, wherein the downlink control information comprises a plurality of fields;

decode, based on an encoding scheme, the downlink control information block to obtain the downlink control information for the plurality of transport blocks, wherein at least two fields of the downlink control information are jointly decoded according to the encoding scheme, wherein each possible output of the encoding scheme corresponds to a jointly valid combination of the at least two fields; and receive the plurality of transport blocks from a base station or transmit the plurality of transport blocks to the base station based at least in part on the downlink control information.

17. The apparatus of claim 16, wherein the at least two fields comprise a hybrid automatic repeat request (HARQ) process identifier field and a new data indicator field, and decoding the downlink control information comprises:

omit new data indicator information from the new data indicator field for unscheduled HARQ processes from the downlink control information block.

18. The apparatus of claim 17, wherein the at least two fields further comprise a redundancy version index field, and decoding the downlink control information further comprises:

omit redundancy version index information for unscheduled HARQ processes from the downlink control information block.

19. The apparatus of claim 17, wherein the HARQ process identifier field comprises a number of bits equal to a number of transport blocks scheduled by the downlink control information.

20. The apparatus of claim 17, wherein the new data indicator field comprises a number of bits equal to a number of transport blocks scheduled by the downlink control information.

21. The apparatus of claim 16, wherein the plurality of fields comprises a number of repetitions field configured to signal a number of repetitions per transport block of the plurality of transport blocks.

22. The apparatus of claim 21, wherein the at least two fields comprise the number of repetitions field and a redundancy version indicator field, and decoding the downlink control information comprises:
set a size of the redundancy version indicator field based at least in part on the number of repetitions per transport block signaled by the number of repetitions field.

23. The apparatus of claim 22, wherein the instructions to set the size of the redundancy version indicator field comprises one or more of: are executable by the processor to cause the apparatus to:
set the size of the redundancy version indicator field to 0 bits if the number of repetitions per transport block is greater than or equal to 4, or setting the size of the redundancy version indicator field to 1 bit if the number of repetitions per transport block is equal to 2, or setting the size of the redundancy version indicator field to 2 bits if the number of repetitions per transport block is equal to 1.

24. The apparatus of claim 21, wherein the at least two fields comprise the number of repetitions field and a modulation and coding scheme indicator field, and decoding the downlink control information comprises:
set a size of the modulation and coding scheme indicator field based at least in part on one or more of: a number of repetitions per transport block signaled by the number of repetitions field or a channel condition.

25. The apparatus of claim 24, wherein the instructions are further executable by the processor to cause the apparatus to:
receive from the base station a message indicating a restriction of values for the modulation and coding scheme indicator field based at least in part on the channel condition.

26. The apparatus of claim 24, wherein the modulation and coding scheme indicator field signals one or more of a modulation and coding scheme that is common to each transport block of the plurality of transport blocks or a bitmap separately indicating a modulation and coding scheme for each transport block of the plurality of transport blocks.

27. The apparatus of claim 26, wherein the instructions are further executable by the processor to cause the apparatus to:
receive from the base station an indication of whether the modulation and coding scheme indicator is to signal the modulation and coding scheme that is common to each transport block of the plurality of transport blocks or the bitmap separately indicating the modulation and coding scheme for each transport block of the plurality of transport blocks.

28. The apparatus of claim 21, wherein the at least two fields comprise the number of repetitions field and a frequency hopping indicator field, and decoding the downlink control information comprises:
omit the frequency hopping indicator field if a number of repetitions per transport block signaled by the number of repetitions field is equal to 1.

29. The apparatus of claim 21, wherein the number of repetitions field comprises one or more of a number of repetitions that is common to each transport block of the plurality of transport blocks or a bitmap separately indicating a number of repetitions for each transport block of the plurality of transport blocks.

30. The apparatus of claim 29, wherein the instructions are further executable by the processor to cause the apparatus to:
receive from the base station an indication of whether the number of repetitions field is to signal the number of repetitions that is common to each transport block of the plurality of transport blocks or the bitmap separately indicating the modulation and coding scheme for each transport block of the plurality of transport blocks.

* * * * *